US005255206A

United States Patent [19]
Pegis

[11] Patent Number: 5,255,206
[45] Date of Patent: Oct. 19, 1993

[54] METHOD AND APPARATUS FOR LIGHTING DESIGN

[75] Inventor: Richard J. Pegis, Hartford, Conn.

[73] Assignee: The McKenna Group, Inc., Troy, Mich.

[21] Appl. No.: 750,792

[22] Filed: Aug. 27, 1991

[51] Int. Cl.[5] ...................... H05B 35/00; G02B 27/00
[52] U.S. Cl. ...................................... 364/512; 364/578
[58] Field of Search ................. 364/512, 578; 395/126

[56] References Cited

U.S. PATENT DOCUMENTS

| | | | |
|---|---|---|---|
| 4,831,546 | 5/1989 | Mitsuta et al. | 364/512 |
| 5,016,185 | 5/1991 | Kuester et al. | 364/512 |
| 5,119,317 | 6/1992 | Narikawa et al. | 364/512 |
| 5,122,971 | 6/1992 | Kamejima et al. | 364/512 |
| 5,163,015 | 11/1992 | Yokota | 364/512 |

OTHER PUBLICATIONS

Hewlett Packard, *High Frequency Structure Simulator,* printed in USA, Feb. 1990.

*Primary Examiner*—Jack B. Harvey
*Assistant Examiner*—Jae H. Choi
*Attorney, Agent, or Firm*—Dykema Gossett

[57] ABSTRACT

A method and apparatus 10 is disclosed for efficiently and accurately designing a lighting system, having a lamp 602, mirror 604, and lens 606. This lighting system may be made to generate a profile of light having a direction and an intensity which is closely akin to that desired for a particular application. Additionally, a methodology is disclosed to efficiently and accurately printing colored information from a monitor 20 to a printer 16.

14 Claims, 15 Drawing Sheets

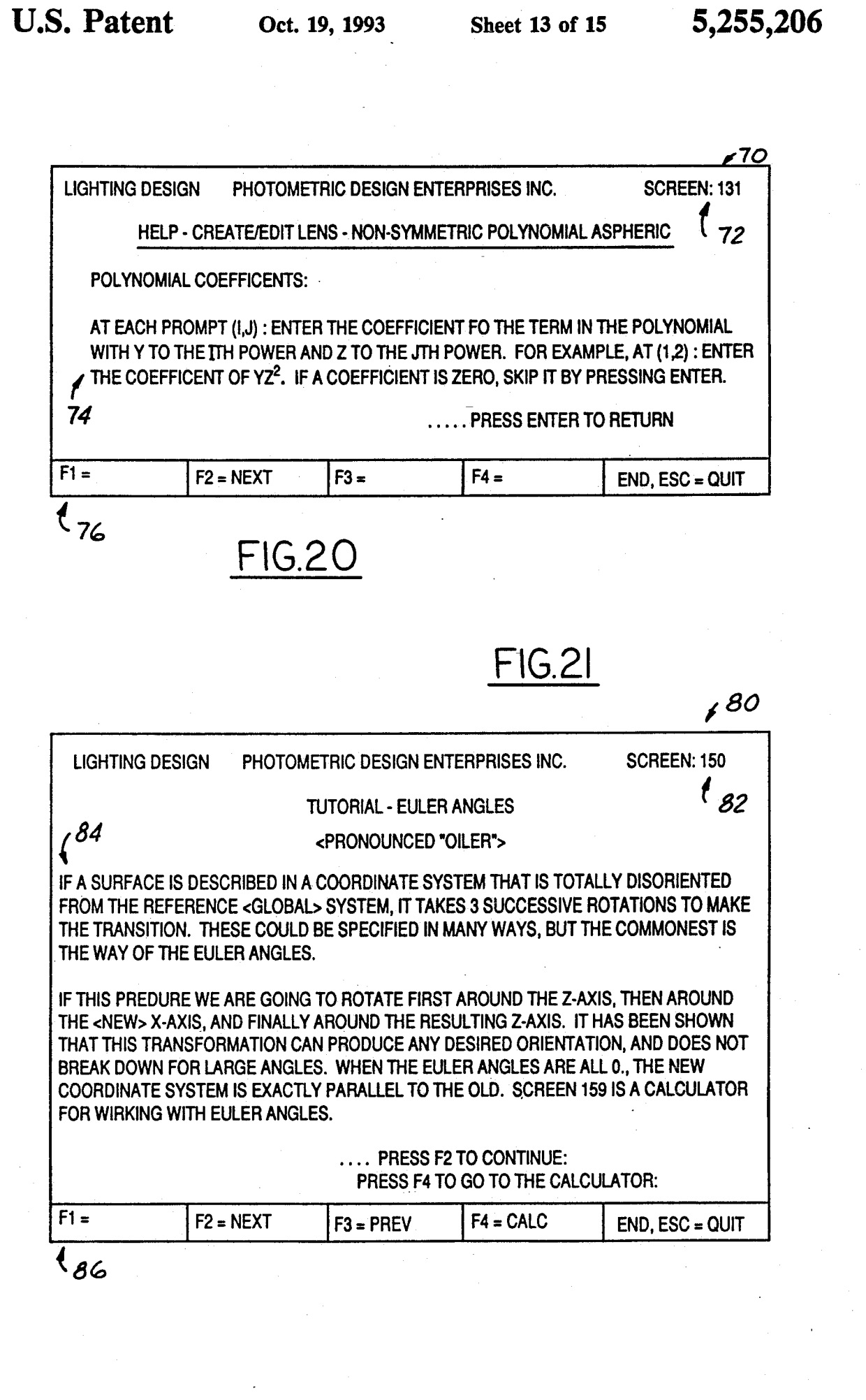

70

LIGHTING DESIGN PHOTOMETRIC DESIGN ENTERPRISES INC. SCREEN: 131

HELP - CREATE/EDIT LENS - NON-SYMMETRIC POLYNOMIAL ASPHERIC 72

POLYNOMIAL COEFFICENTS:

AT EACH PROMPT (I,J) : ENTER THE COEFFICIENT FO THE TERM IN THE POLYNOMIAL WITH Y TO THE ITH POWER AND Z TO THE JTH POWER. FOR EXAMPLE, AT (1,2) : ENTER THE COEFFICENT OF $YZ^2$. IF A COEFFICIENT IS ZERO, SKIP IT BY PRESSING ENTER.

74

.....PRESS ENTER TO RETURN

| F1 = | F2 = NEXT | F3 = | F4 = | END, ESC = QUIT |
|---|---|---|---|---|

76

FIG.20

FIG.21

80

LIGHTING DESIGN PHOTOMETRIC DESIGN ENTERPRISES INC. SCREEN: 150

TUTORIAL - EULER ANGLES 82

84

<PRONOUNCED "OILER">

IF A SURFACE IS DESCRIBED IN A COORDINATE SYSTEM THAT IS TOTALLY DISORIENTED FROM THE REFERENCE <GLOBAL> SYSTEM, IT TAKES 3 SUCCESSIVE ROTATIONS TO MAKE THE TRANSITION. THESE COULD BE SPECIFIED IN MANY WAYS, BUT THE COMMONEST IS THE WAY OF THE EULER ANGLES.

IF THIS PREDURE WE ARE GOING TO ROTATE FIRST AROUND THE Z-AXIS, THEN AROUND THE <NEW> X-AXIS, AND FINALLY AROUND THE RESULTING Z-AXIS. IT HAS BEEN SHOWN THAT THIS TRANSFORMATION CAN PRODUCE ANY DESIRED ORIENTATION, AND DOES NOT BREAK DOWN FOR LARGE ANGLES. WHEN THE EULER ANGLES ARE ALL 0., THE NEW COORDINATE SYSTEM IS EXACTLY PARALLEL TO THE OLD. SCREEN 159 IS A CALCULATOR FOR WIRKING WITH EULER ANGLES.

.... PRESS F2 TO CONTINUE:
PRESS F4 TO GO TO THE CALCULATOR:

| F1 = | F2 = NEXT | F3 = PREV | F4 = CALC | END, ESC = QUIT |
|---|---|---|---|---|

86

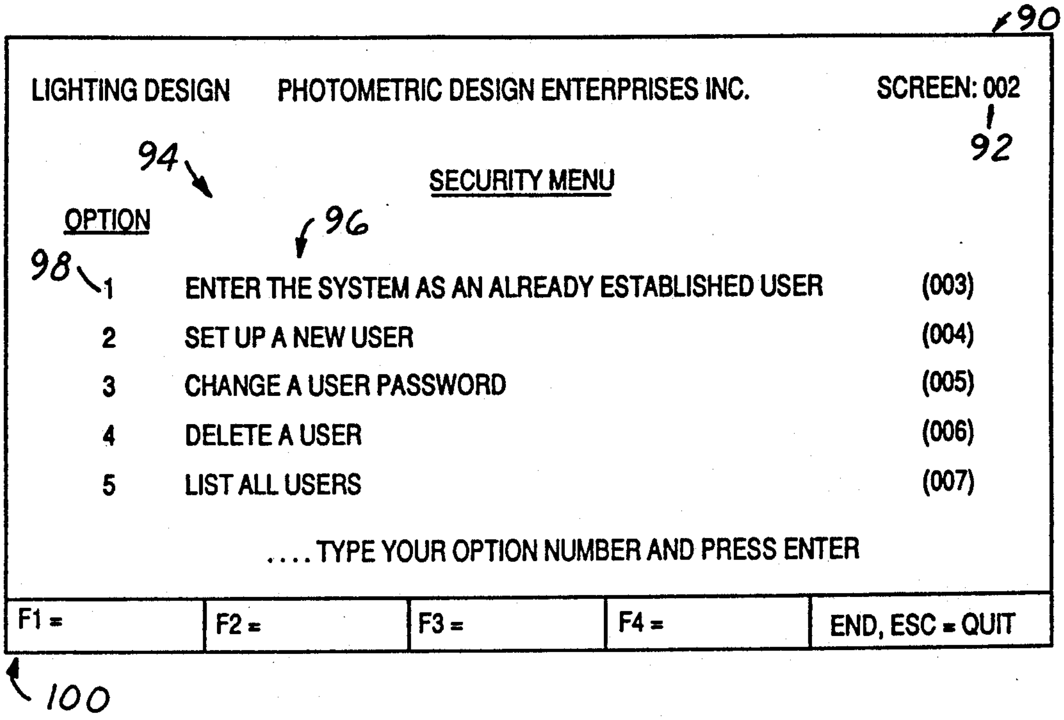
FIG.22
FIG.23
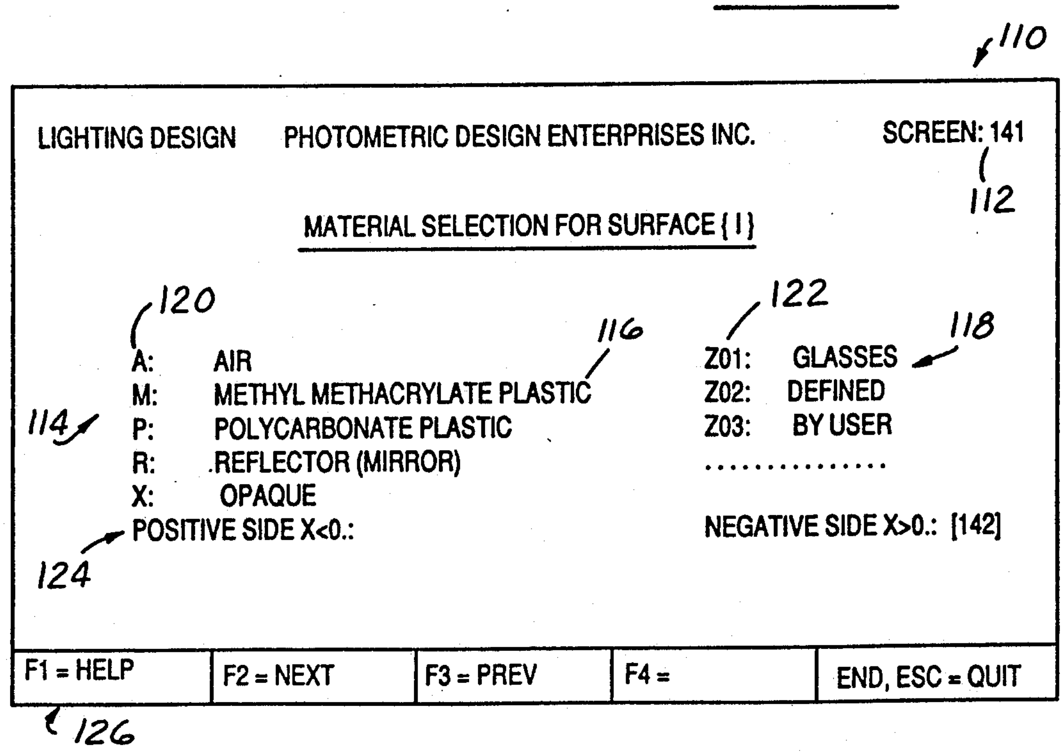

METHOD AND APPARATUS FOR LIGHTING DESIGN

BACKGROUND OF THE INVENTION

1. Field of the Invention

This invention generally relates to a method and apparatus for lighting design and more particularly, to a computerized method and apparatus for designing a lamp, lens, and mirror, such that a desired pattern and intensity of light is cooperatively generated by these designed lighting components.

2. Discussion

Lighting systems are used to generate or produce a desired pattern and intensity of light, consistent with a specific application that the systems are used within. One such application involves the use of these lighting systems upon an automobile. Examples of such automobile lighting systems include headlights, tail-lights, and turn lights.

While each of these automobile lighting systems is somewhat similar in that they each generally employ a lamp, lens, and mirror, they do so in a variety of ways consistent with the desired pattern and intensity of light desired to be radiated by each of these systems. For example, in a typical headlight system, very high intensity light is produced within an angular pattern having a very large horizontal area, but a very compact vertical range. In this manner, the produced light does not shine directly into an approaching vehicle driver's eyes, yet effectively allows the automobile driver to view the surface of the road that the vehicle is travelling upon. In contrast, a turn signal lighting system is usually made to radiate a relatively low intensity light, having a pattern defining a very compact horizontal and vertical range sufficient to enable the driver to view only a rather limited portion of the road, alongside the turning vehicle. Each of these different automobile lighting systems therefore requires different component configurations, consistent with the intensity and pattern of the desired generated light.

In the past, each of these lighting systems was usually designed through a "trial and error" approach, which required a number of prototype systems to be actually built and tested in order to view the effect of various component changes, upon the pattern and intensity of the produced light. This "trial and error" approach was very inefficient; costly; and time consuming thereby, unnecessarily increasing the overall costs associated with each of these designed lighting systems.

SUMMARY OF THE INVENTION

It is, therefore, a primary object of this invention to provide a method and apparatus for efficiently designing a lighting system which produces a desired pattern and intensity of light.

It is another object of this invention to provide a computer-based apparatus which allows many different lighting system components to be selectively modified and which is adapted to display the pattern and intensity of the produced light, cooperatively radiated by the modified component configurations.

It is yet another object of this invention to provide a computer-based lighting system apparatus which allows several different types of lighting systems to be automatically designed and developed by a lighting system designer.

It is a further object of this invention to provide a computer-based apparatus which is adapted to automatically modify various components of a lighting system and which is further adapted to display the pattern and intensity of light produced by the lighting system, selectively incorporating each of the component modifications, and to automatically compare the produced light pattern and intensity with a previously stored pattern and intensity profile.

It is a further object of this invention to provide a computer-based apparatus which is adapted to automatically modify the design of certain lighting system components, effective to allow the designed lighting system to produce light in a pattern and an intensity consistent with target pattern and intensity lighting profile.

It is yet another object of this invention to provide a computer-based apparatus which allows for the design of several automobile lighting systems such as headlights, tail-lights, and turn signals and which allows these designs to be stored for future use.

According to a first aspect of the present invention, an apparatus for lighting design is provided. This apparatus comprises processing means for designing a lamp, mirror, and lens; and display means, coupled to the processing means, for displaying a pattern and intensity of light cooperatively produced by the designed lamp, mirror, and lens.

According to a second aspect of this invention, a methodology is disclosed for designing a lighting system, comprising the steps of defining a series of lighting design screens each screen requiring certain design data to be input thereon; defining the order that the screens are to be displayed; storing each of the screens with a first file; storing screen sequence data corresponding to the order of the display of the screens within a second file; displaying each of the series of lighting design screens in the order specified by the data contained within the second file; and storing data, input in response to the displayed screens, within a third file.

It is yet a further object of this invention to provide a computer-based apparatus which allows a lens to be selectively designed, effective to allow the designed lens to cooperate with a previously specified mirror and lamp so as to cooperatively radiate light in a desired pattern and having a desired intensity.

It is yet another object of this invention to provide a computer-based apparatus which allows a mirror to be selectively designed, effective to allow the designed mirror to cooperate with a previously specified lamp and lens so as to cooperatively radiate light in a desired pattern and intensity.

It is yet a further object of this invention to provide a computer-based apparatus which allows a lamp to be selected and which is effective to allow the selected lamp to cooperate with a previously specified lens and mirror so as to cooperatively radiate light in a desired pattern and intensity.

Further objects, features and advantages of the invention will become apparent from a consideration of the following description and claims, when taken in conjunction with the accompanying drawings:

BRIEF DESCRIPTION OF THE DRAWINGS

Various advantages of the present invention will become apparent to those skilled in the art by reading the following specification and by reference to the following drawings in which:

FIG. 20 is an illustration of a "Help" screen, utilized by the preferred embodiment of this invention;

FIG. 21 is an illustration of an "Information" screen, utilized by the preferred of this invention;

FIG. 22 is an illustration of a "Menu" screen, utilized by the preferred embodiment of this invention;

FIG. 23 is an illustration of a "Data" screen, utilized by the preferred embodiment of this invention;

DETAILED DESCRIPTION OF THE INVENTION

Figure 1:
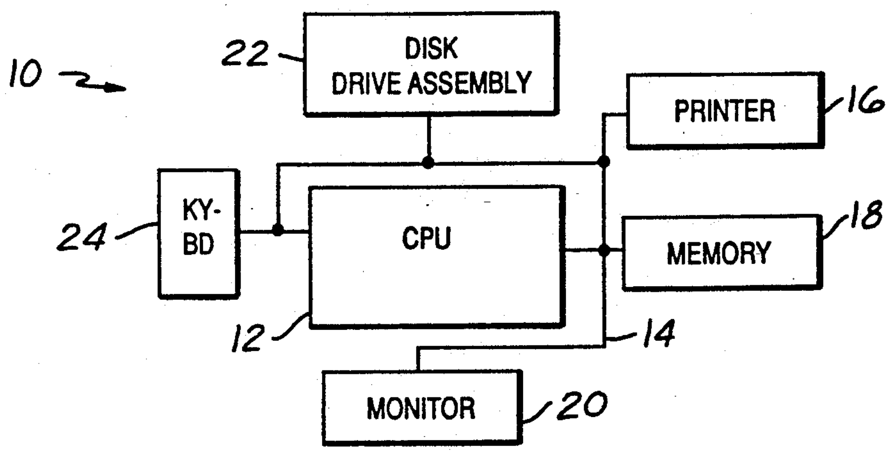
FIG. 1 is a block diagram of a lighting design system made in accordance with the teachings of the preferred embodiment of this invention.

Referring now to FIG. 1, there is shown a lighting design system 10, made in accordance with the teachings of the preferred embodiment of this invention. As shown, system 10 includes a central processing unit 12, coupled by bus 14 to a printer 16, memory 18, monitor 20, disk drive assembly 22, and keyboard 24.

In operation, lighting system design software, made in accordance with the teachings of the preferred embodiment of this invention and stored upon a typical data storage disk, is input to central processing unit 12, by means of disk drive assembly 22. The design software is then stored in memory 18 and the various lighting system design operations, which are performed by processing unit 12, are defined in sequence and in type, by the stored software. Moreover, the software requires and solicits a lighting system designer to selectively enter certain lighting component design parameter data, which is used by the software in performing the overall lighting system design operation. Specifically, the interaction between the software and the user occurs through monitor 12 and keyboard 24. Specifically, keyboard 24 is adapted to allow a system designer to interactively input selected data into central processing unit 12, in response to the various software requests or prompts, appearing or displayed on monitor 12. Further, printer 16, under the control of processor 12, is adapted to selectively print various lighting system design specifications, including several component designs, at the request of the designer, and to print various intensity pattern profiles, corresponding to various lighting system designs.

It should be realized, by one of ordinary skill in the art, that central processing unit 12 may be one of a variety of processing unit types but, in a preferred embodiment of this invention, comprises a model 80386 processor, manufactured by the Intel Corporation, of Palo Alto, Calif. As known in the art, the 80386 processor utilizes the disk operating system "MS-DOS", produced by the Microsoft Corporation, of Seattle, Wash. and is compatible with other types of software, produced by IBM. Moreover, the software, comprising the preferred embodiment of this invention, utilizes the disk operating system to control the operation of unit 12, in a manner to be explained. In this manner, processor 12 acts under stored program control.

Figure 2:
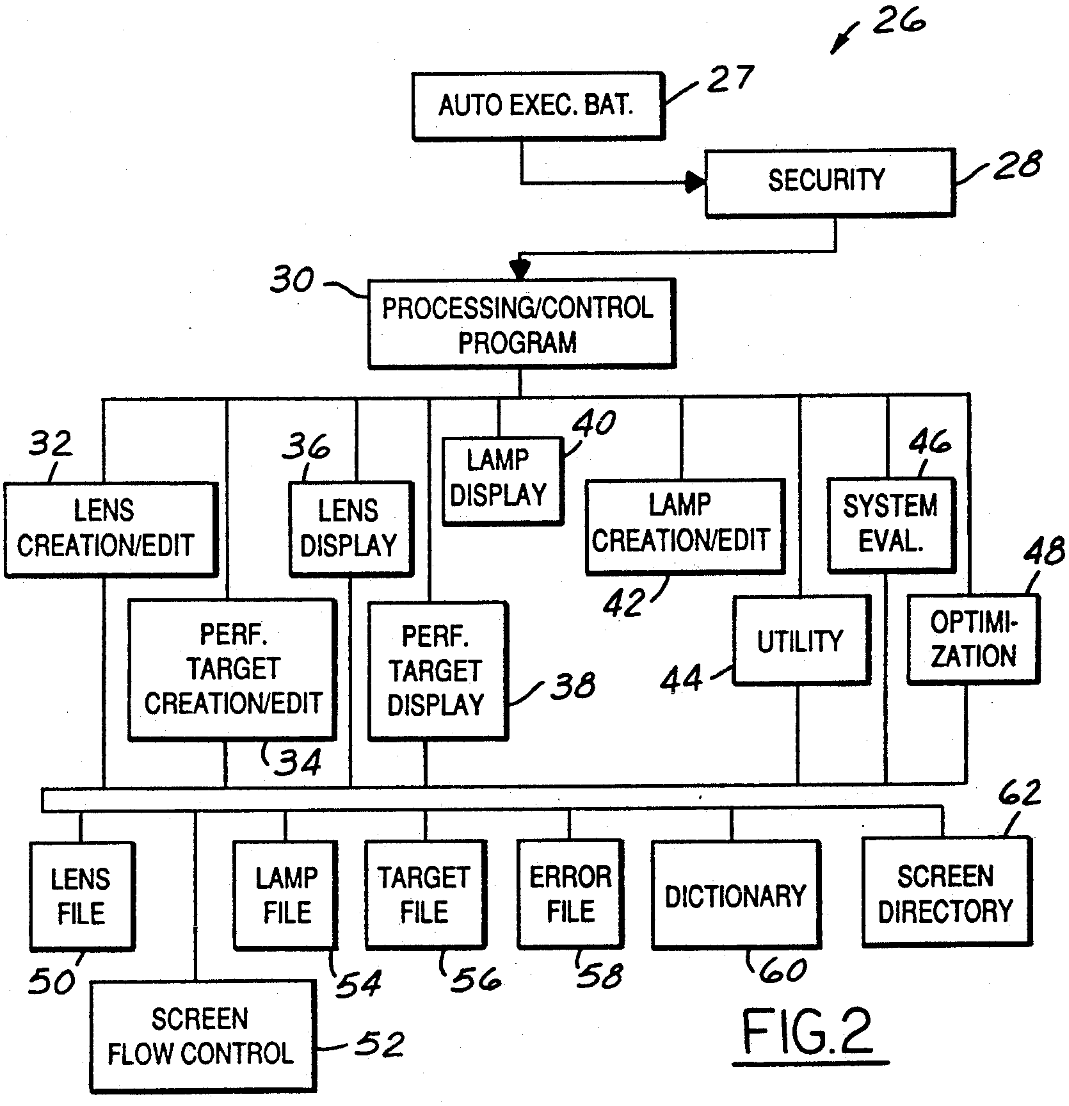
FIG. 2 is a software architectural diagram, illustrating the software architecture utilized by the system of the preferred embodiment of this invention.

The lighting system design software, utilized within central processing unit 12, is shown in the software architectural diagram 26, of FIG. 2. Specifically, the "autoexec.bat" portion of the Disk Operating System is coupled to a security software module 28, which ensures that only authorized designers have access to the software resident within and controlling processor 12. Security module 28 is also coupled to a processing/control program 30 which controls the sequence and types of lighting design operations, which are presented to a typical lighting designer. Specifically, program 30 utilizes the various lighting system design software modules 32, 34, 36, 38, 40, 42, 44, 46, 48, 50, 52, 54, 56, 58, 60, and 62, of the preferred embodiment of this invention.

Before discussing the actual operation of each of the modules 32–62, a discussion concerning the use and generation of screens, by system 10, will allow a more thorough understanding of the operation of system 10. In the preferred embodiment of this invention, each screen presented to a designer is one of five general types. Specifically, a screen may be of a "Help"; "Data-/Operation"; "Information"; "Menu Selection"; or "Error Message". type. A "Help" screen may only be displayed upon request by a lighting system designer and only after the designer has viewed at least one of the other screen types. Moreover, a "Help" screen, is designed to provide explanatory comments concerning the screen that the designer was viewings, prior to requesting display of the help screen. After the "Help" screen has been viewed, the software always directs CPU 12 to display the screen that was previously displayed. The lighting design operations then proceeds in normal fashion. It should also be realized that several "Help" screens may be traversed before control is returned to the originally displayed screen, each "Help" screen containing information associated with a single one of the screens.

As shown in FIG. 20, a typical "Help" screen 70 includes a uniquely corresponding screen identification number field 72 as well as an explanatory textual field 74, describing characteristics or requirements of the screen that the designer was previously reading. Field 72 allows each screen, of system 10, to be uniquely identified. Moreover, screen 70 includes a keyboard prompt section 76 indicating, to the designer, that the typical keyboard "End" key should be struck to exit the entire software design routine. The "Return" key is used, as shown, to return to the previously displayed screen. Alternatively, the typical keyboard "F2" key is struck to view the next "Help" screen, if one exists. In this manner, a user is guided through the lighting designs process in an efficient manner and without having to constantly refer to a number of technical system manuals in order to gain an understanding of unfamiliar lighting design areas.

An "Information" screen is used in the preferred embodiment of this invention, to present explanatory material to a user for the purpose of enlightening the user as to various aspects of general lighting design. This screen type differs from that of the "Help" screen, due to the fact that "Information" screens are presented in the normal sequence of the screen display operation, without being requested by the user and are directed to very general lighting system aspects, rather than specific user questions.

One example of such an "Information" screen is that shown in FIG. 21. As shown, a typical "Information" screen 80 includes the previously described screen identification number field 82, along with an explanatory texture field 84 to explain certain general aspects of lighting system design, such as the use of Euler Angles. Moreover, screen 80 includes a keyboard field 86 which directs the user to engage the typical "F2" key to continue to the next screen; to engage the typical "F3" key to go back to previously displayed screen; to engage the typical "F4" key to display a screen which performs a sample Euler calculation upon a set of three user input angles; and to engage the typical "Escape" key to exit from the software program. It should be noted, that as in the case of the "Help" screen, a series of "Information" screens may be sequentially presented to a user in order to cooperatively present a tutorial on a particular design aspect.

A "Menu" type screen is used, by the preferred embodiment of this invention, to present a list of system features or capabilities to the user and to prompt the user to select at least one of the features which is to be presently utilized in the lighting system design process.

One example of such a "Menu" type screen is that shown in FIG. 22. As shown, "Menu" type screen 90 includes the previously explained and uniquely assigned screen designation field 92. Further, screen 90 includes a textual field 94 having a list of global or generic system functions 96, such as deleting a user from the system. Corresponding to each of the functions 96, is an option designation field 98. Designation field 98 defines the typical keyboard key which must be engaged by the user, in order to select the appropriate option. Screen 90 further includes a keyboard selection portion 90 which prompts the user to engage the typical "Escape" key, in order to exit the software routine of system 10. As before, a series of "Menu" type screens 90, may be sequentially presented to the user as part of the design process of system 10.

A "Data" type screen is used, by the preferred embodiment of this invention, to define the types of design data required to be input by the user and to prompt the user to interact with the software by specifying and inputting the specified data, to processor 12, by means of keyboard 24. One example of a typical "Data" screen, used by system 10, is shown in FIG. 23.

Specifically, typical "Data" screen 110 includes the previously explained and uniquely corresponding screen designation field 112. Moreover, screen 110 includes a textual field 114 comprising a list of selectable options 116 or user required data descriptions 118.

As shown, displayed alongside each option 116 is a designator field 120, corresponding to the keyboard key that must be engaged by the user in order to select that particular data option. Further, each user defined field 118 also includes a designator 122, corresponding to the keyboard key that must be engaged in order to select the "User Defined" option. After this option is selected, the user is then directed to use keyboard 24 to enter the value of the user data.

Screen 110 further includes an explanatory textual field portion 124, used to explain the characteristics of the user data requested (i.e. such as the side of the surface that data corresponds to) and a keyboard information portion 126.

Portion 126 prompts the user to engage the typical "F1" key in order to force the display of a previously explained "Help" type screen or to engage the typical "F2" and "F3" keys to respectively force the display of the next sequentially placed screen or the previously viewed screen. As before, portion 126 also prompts the user to engage the typical "Escape" key to exit from the entire software routine, of system 10.

Figure 24:
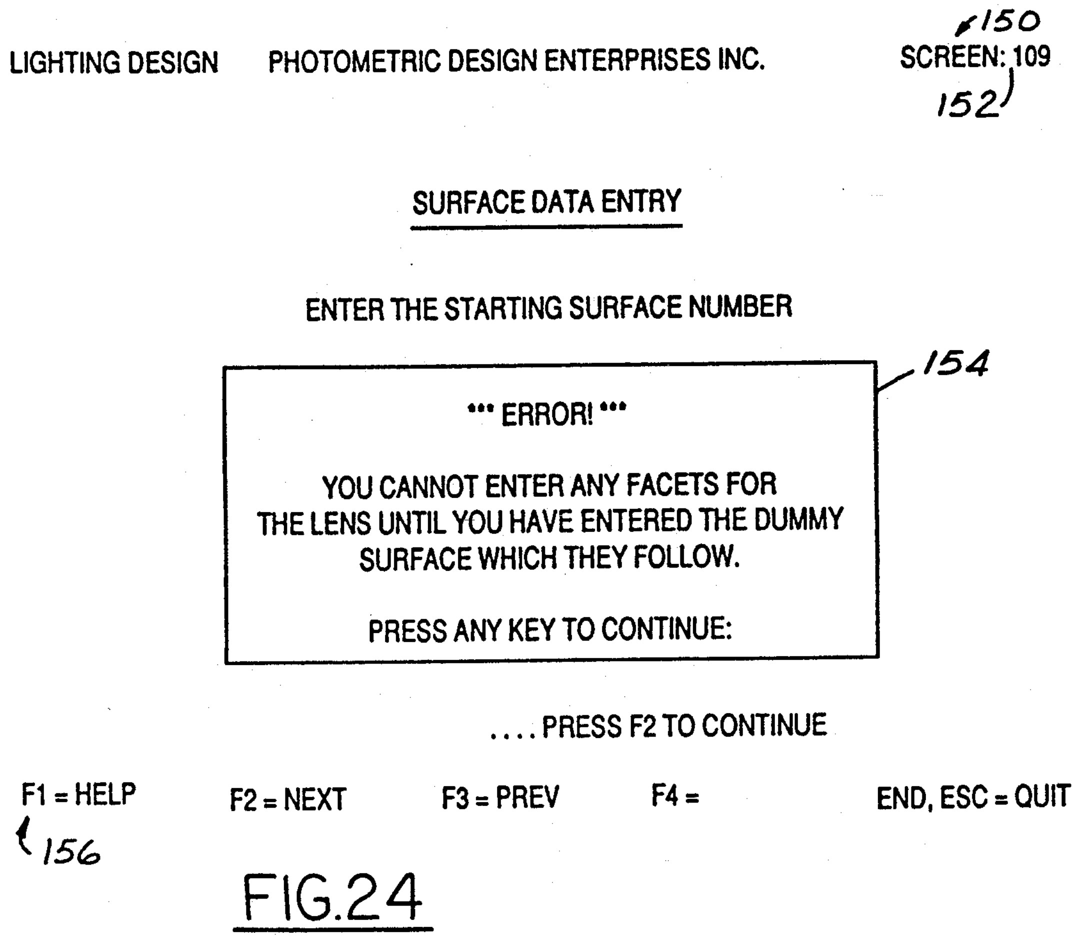
FIG. 24 is an illustration of an "Error Message" screen, utilized by the preferred embodiment of this invention.

The fifth and last type of screen, associated with system 10, is that of the typical "Error Message" screen. Specifically, these screens are used to inform a user of an incorrect user data input. As shown in FIG. 24, "Error Screen" 150 includes the previously described and uniquely corresponding screen identification field 152 as well as a textual error explanation field 152, which incorporates an explanation of the error that the user has made.

As further shown in FIG. 24, screen 150 also includes a keyboard description portion 156, prompting the user to engage the typical "F1" key if a "Help" type screen is needed; to engage the typical "F2" key if the user has noted the error and wishes to view the screen that the error was entered in response to, and to engage the typical "F3" key to view the screen, having a sequential display position before that of the screen that prompted the error response. Further, portion 156 includes a prompt for the user to engage the typical "End" key if the user desires to exit from the entire software routine of system 10.

In the preferred embodiment of this invention and as further shown in software architectural diagram 26, a central dictionary file 60 is employed to list each field 120, 122 of each of the screens, to which a system user is to input data. Moreover, each field 120, 122 comprises a separate file structure within the overall dictionary file 60. Specifically, each file structure has the following information associated with it:

(1) the actual name given to the field, such "APLEN", the name given to the aperture length of a lens;

(2) a data association flag which associates the data with a particular surface (including no particular surface) or with data to be used during the operation of program, such as the color of traced rays;

(3) the data type (i.e. floating point, integer, or alphanumeric), expected to be input from keyboard 24, in response to the displayed field;

(4) the location within file 60 that this file resides within;

(5) the maximum field length associated with the displayed field;

(6) the number of displayed field decimal position;

(7) a "calculation" type;

(8) the screen number (i.e. corresponding to field numbers 72, 82, 92, 112, and 152) that the field resides within;

(9) item number or field location within the screen; and

(10) description of the field.

The "calculation" type determines whether processor 12 takes action only after data is entered into the field by a user (i.e. "post processing"); whether central processing unit 12 takes action before the field is entered by the user (i.e. "preprocessing"); or whether no calculation or action is required by central processing unit 12, in response to this particular user input data field. One example of preprocessing activity involves the processing of prior input data so as to allow this data to be used with the currently input data in order to arrive at a final lighting design calculation.

As earlier stated, file 62 houses or stores each of the screens, comprising one of the types 70, 80, 90, 110, and 150, previously discussed. In the preferred embodiment of this invention, the order that the screens are presented to a user is predetermined and is based upon user input to the existing displayed screen. That is, each possible system screen is uniquely identified by fields 72, 82, 92, 112, and 152. Every possible allowed user response, to each screen, is mapped to a response screen number. This mapping is then stored in flow control file 52. Therefore, processor 12 will cause a screen to be displayed, in response to user input, by reading file 52 and comparing the user input and current screen number to the data contained therein. Once matching an input and current screen number to the contained data, processor 12 will be directed to fetch a particular screen from directory 62.

This fetching operation comprises a request, from program 30 to directory 62, requesting the screen contents of the desired screen. These contents are sent to monitor 20 where the screen is displayed.

User input, in response to a displayed screen, is received by processor 12, from keyboard 24, and is compared with the entry in dictionary 60, uniquely corresponding to the current displayed screen. If the received data type, field length and sequence of data, is correct, this data is stored in memory 18 where it may be processed by processor 12 or stored for future use.

If the input data is deemed to be incorrect, either in type, length, or expected response sequence, processor 12 accesses error file 58 to determine the appropriate error number. That is, file 58 includes a listing of each possible error associated with each currently displayed screen. Processor 12 therefore obtains an error code from file 58 and this error code is then given to flow control file 52, which instructs processor 12 to request a certain error screen from display file 62.

Figure 25:
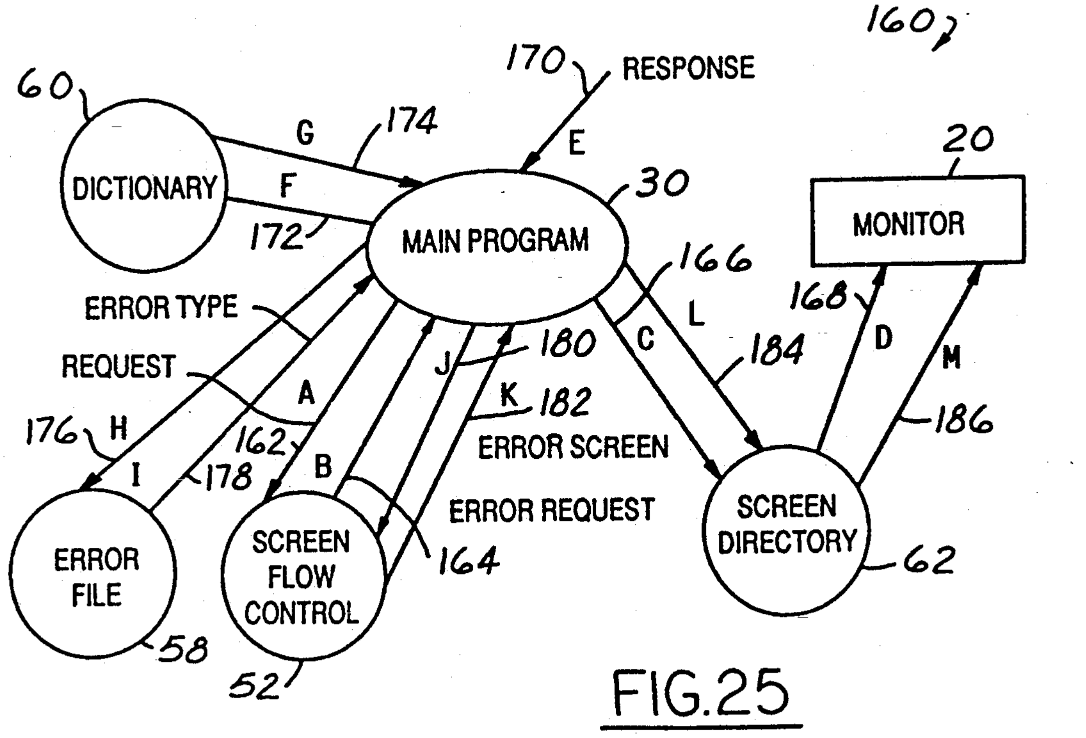
FIG. 25 is a state diagram of the central processing unit, shown in FIG. 1, and further illustrating the methodology used in display of screens, by the preferred embodiment of this invention.

The process of displaying screens of information, in the preferred embodiment of this invention, may be more fully understood by reference to the processor shown in diagram 160 of FIG. 25. As shown, initially main program 30 initiates a request signal 162 to flow control file 52, for the next screen of information to be displayed upon monitor 20. File 52, upon receipt of signal 162, generates a screen signal 164, which is received by program 30, resident within controller 12.

Program 30 then issues a screen command signal 166 to directory 62, requesting the previously specified screen. Directory 62 then forces this specified screen, by means of signal 168, to be displayed upon monitor 20.

In response to this screen, a user engages keyboard 24 and generates a signal 170, to program 30. This signal is sent to directory 60, by means of signal 172, where it is checked for errors and a determination is made whether post, pre, or no processing is required.

Signal 174 is generated by directory 60, to program 30, specifying the processing type and errors, if any. If an error exists, program 30 sends a signal 176 to file 58, requesting the uniquely corresponding error number. This error type is sent by file 58 to program 30, by means of signal 178. If no error exists, program 30 stores the received response and forces controller 12 to perform any necessary calculations on the received data.

Program 30 sends signal 180 to file 52 requesting a screen number, associated with the received error. If no error exists, signal 180 requests the number of the next processing screen. File 52 generates the next screen number by signal 182, which is received by program 30. This screen number is used by program 30, within signal 184, to request directory 62 to display the desired screen. This screen is then sent to monitor 20, by signal 186. In the foregoing manner, screens are sequentially delivered to monitor 20 consistent with lighting design operations or error conditions. To more fully understand the lighting design features of system 10, reference is again made to diagram 2.

As shown in architectural diagram 2, the software utilized by central processing unit 12 includes a lens creation/edit module 32 which allows a lens to be selectively created and modified in order to provide the desired pattern and intensity of emitted light. This lens design may be then stored in the file 50 or displayed and printed upon printer 16, by use of lens display module 36.

Moreover, software architecture 26 further includes a lamp creation/edit module 42 which allows lamp design data to be stored and selected such that the desired pattern and intensity of light is achieved. This specified lamp may be displayed upon monitor 20, by display module 40, or selectively stored in file 54. Lens creation/edit module 32 similarly allows a lens to be designed for a selected intensity/pattern profile, while modules 36 and 50 respectively allow the designed lens to be displayed or stored, within system 10.

Software architecture 26 further includes a performance target creation/edit file 34 which allows a target light distribution and intensity profile to be created or edited by a lighting system designer and to be stored within file 56, or selectively displayed by means of module 38.

Moreover, software architecture 26 further includes a system evaluation module 46 which evaluates the designed lighting system relative to the created target profile, associated with software module 34. More particularly, evaluation module 46 allows a designer to actually view the discrepancies between the target lamp profile and the actual profile, obtained from the current lighting design. Further, software architecture 26 includes an optimization module 48 which selectively and automatically modifies various designed system components and which selectively displays the results of these modifications in order that a user of system 10 may view the various lighting profiles achieved by selectively varying the various lighting components. Lastly, utility module 44 allows different types of printers 16 to be employed within system 10, allows "backup" or secondary files to be maintained by files 50, 54, and 56, and allows for the printing of displayed data, by a color plotter.

To more fully understand the operation of software 30, a flowchart description will now be given, detailing the specific design aspects of each of the modules 32, 34, 36, 38, 40, 42, 46, 48, 50, 54, and 56. These modules, as previously described, utilize specific screens of information with which to address a user, thereby prompting user information from keyboard 24. Throughout the remainder of this discussion, it will be assumed that no errors are occurring and that system 10 is processing information in a desired sequential manner. It will be apparent to one of ordinary skill in the art, that "Help" and "Information" screens may be employed through the process described below and may include any sort of information that the users of system 10 desire.

Figure 3:
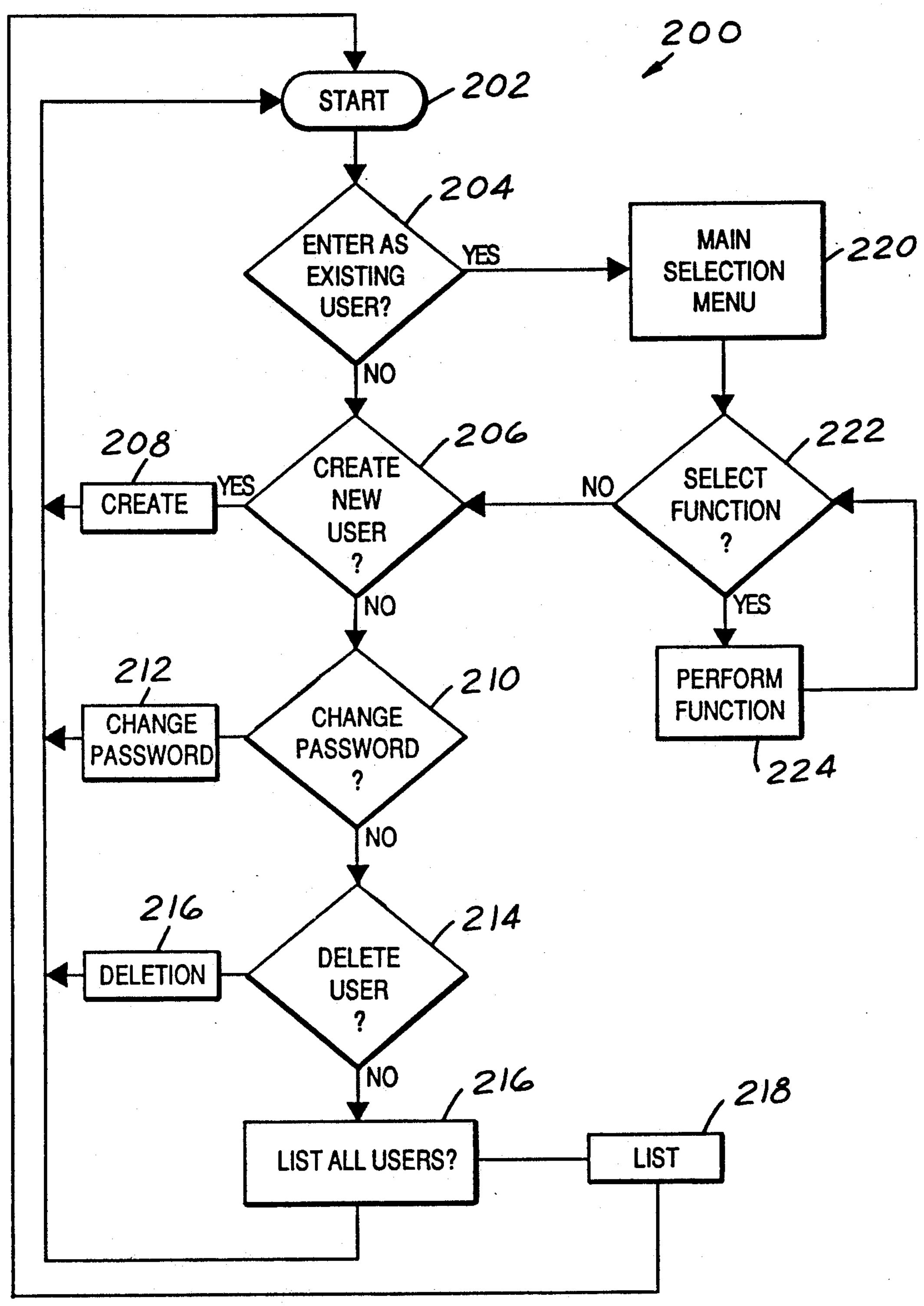
FIG. 3 is a flowchart illustrating the general sequence of steps associated with the operation of the system shown in FIG. 1.

Referring now to flowchart 260, of FIG. 3 there is shown a general sequence of steps associated with the use of system 10, by a typical lighting designer. As shown, flowchart 200 includes a first initial step 202 in which the autoexec.bat portion 27, of the disk operating system, activates security portion 28. Step 202 is followed by step 204 in which a system user must decide whether the user is an existing system user, or a "new user".

If the present user is not an existing user, step 204 is followed by step 206 in which the user must decide whether the user desires to be added as a "new user", to the system 10. If new user creation is desired, step 206 is followed by step 208 in which a new user password is created and stored within central processing unit 12. Step 208 is then followed by step 202. Alternatively, step 206 is followed by step 210 in which the system user must determine whether a change in password is desired. If a change in password is desired, step 210 is followed by step 212 in which the user password is changed. Step 212 is then followed by step 202. Alternatively, step 210 is followed by step 214 in which a user of system 10 must determine whether it is desired to delete that user's password, from system 10. If such deletion is desired, step 214 is followed by step 216 in which the current user's password is deleted. Step 216 is then followed by step 202. Alternatively, step 214 is followed by step 216, in which a user of system 10 must determine whether a listing of all system users is desired. If such a listing is not desired, step 216 is followed by step 2. Alternatively, step 216 is followed by step 218, in which a listing of all users is displayed upon monitor 20. Step 218 is then followed by step 202.

If, in step 204, the user desires to enter system 10 as an existing user, step 204 is followed by step 220. In step 220, a main lighting design selection menu is displayed upon monitor 20, to the system user. Step 220 is then followed by step 222 in which a user is prompted to select a particular lighting design function. If no function is selected, step 222 is followed by step 202. Alternatively, step 222 is followed by step 224 in which system 10 is made to perform the user selected function. Step 224 is then followed by step 222.

Figure 4:
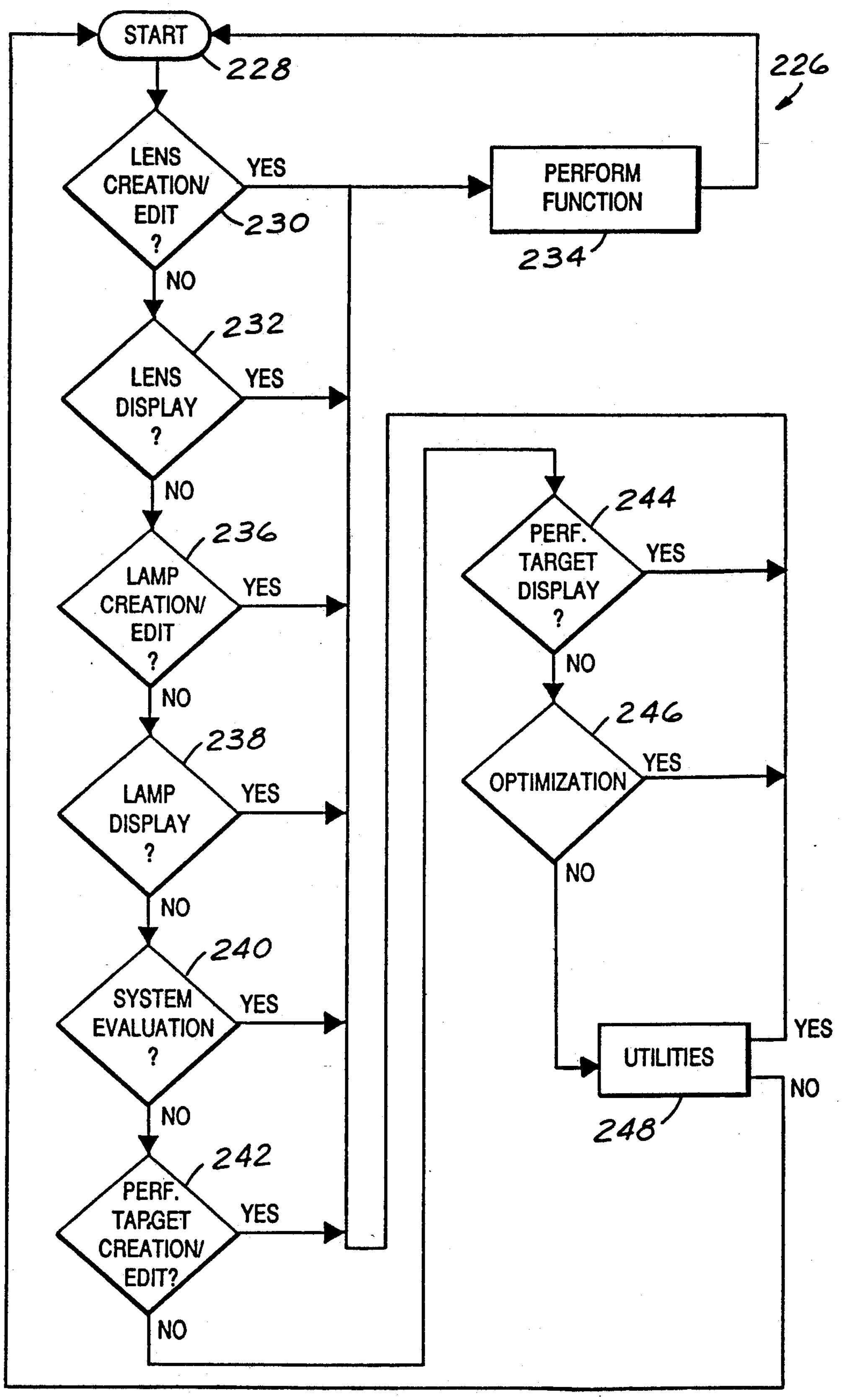
FIG. 4 is a flowchart showing the general sequence of steps associated with the "Main Selection Menu" step, of the flowchart shown in FIG. 3.

The lighting design functions, associated with the main selection menu 220, are detailed in flowchart 226, of FIG. 4. As seen, each selection corresponds to one of the modules 32, 36, 42, 40, 46, 34, 38, 48, and 44. Specifically, flowchart 226 includes an initial step 228, which is traversed upon the selection of a function within step 220. Step 228 is then followed by step 230 in which the user must determine whether it is currently desired to create or edit a lens file. If lens creation/editing is not desired, step 230 is followed by step 232. Alternatively, step 230 is followed by step 234 in which the lens creation/editing function is performed by central processing unit 12, (under the stored program control of software module 32).

In step 232, a user must determine whether it is desired to display a lens file. If such lens display is not desired, step 232 is followed by step 236. Alternatively, step 232 is followed by step 234, in which a selected lens file is displayed upon monitor 20 and/or selectively printed by printer 16.

In step 236, a user must determine whether it is currently desired to create or edit a lamp design file. If it is not desired to create or edit a lamp design file, step 236 is followed by step 238. Alternatively, step 236 is followed by step 234, in which a lamp file is either created or edited by processor 12 (under the stored program control of module 42).

In step 238, a user must determine whether it is currently desired to display a previously stored lamp file. If such a display is not desired, step 238 is followed by step 240. Alternatively, step 238 is followed by step 234 in which a selected lamp file is displayed upon monitor 20 and/or printed by printer 16. This display or printing is accomplished by processor 12, under the control of software module 40.

In step 240, a user must determine whether it is currently desired to evaluate a previously designed lighting system, relative to a target lighting profile. If such evaluation is not desired, step 240 is followed by step 242. Alternatively, step 240 is followed by step 234 in which such a system evaluation is performed by CPU 12, under the control of module 46.

In step 242, a user must determine whether it is desired to create or edit a performance target profile. If the user does not currently desire to create or edit a previously specified and stored performance target file, step 242 is followed by step 244. Alternatively, step 242 is followed by step 234 in which a performance target lamp profile is created or edited, by controller 12, under the stored program control of software module 34. In step 244, a user must determine whether it is desired to display a selected performance target lighting profile upon monitor 20 and/or print such a selected profile upon printer 16. If it is not currently desired to display or print a selected performance target profile, step 244 is followed by step 246. Alternatively, step 244 is followed by step 234 in which a selected lighting target profile is made to displayed upon monitor 20 and/or printed by printer 16, by use of CPU 12, acting under the stored program control of software module 38.

In step 246, a user must determine whether it is currently desired to perform a design optimization upon a selected and previously designed lighting system. This optimization is performed by processor, acting under the stored program control of software module 48. Alternatively, step 246 is followed by step 248 in which a user must determine whether several utility programs, such as creating backup storage files for software modules 32–62; specifying the type of printer 16 employed within system 10, and deleting the previously stored backup files, are desired. If these utility functions are desired, step 248 is followed by step 234. Alternatively, step 248 is followed by step 228.

Figure 5:
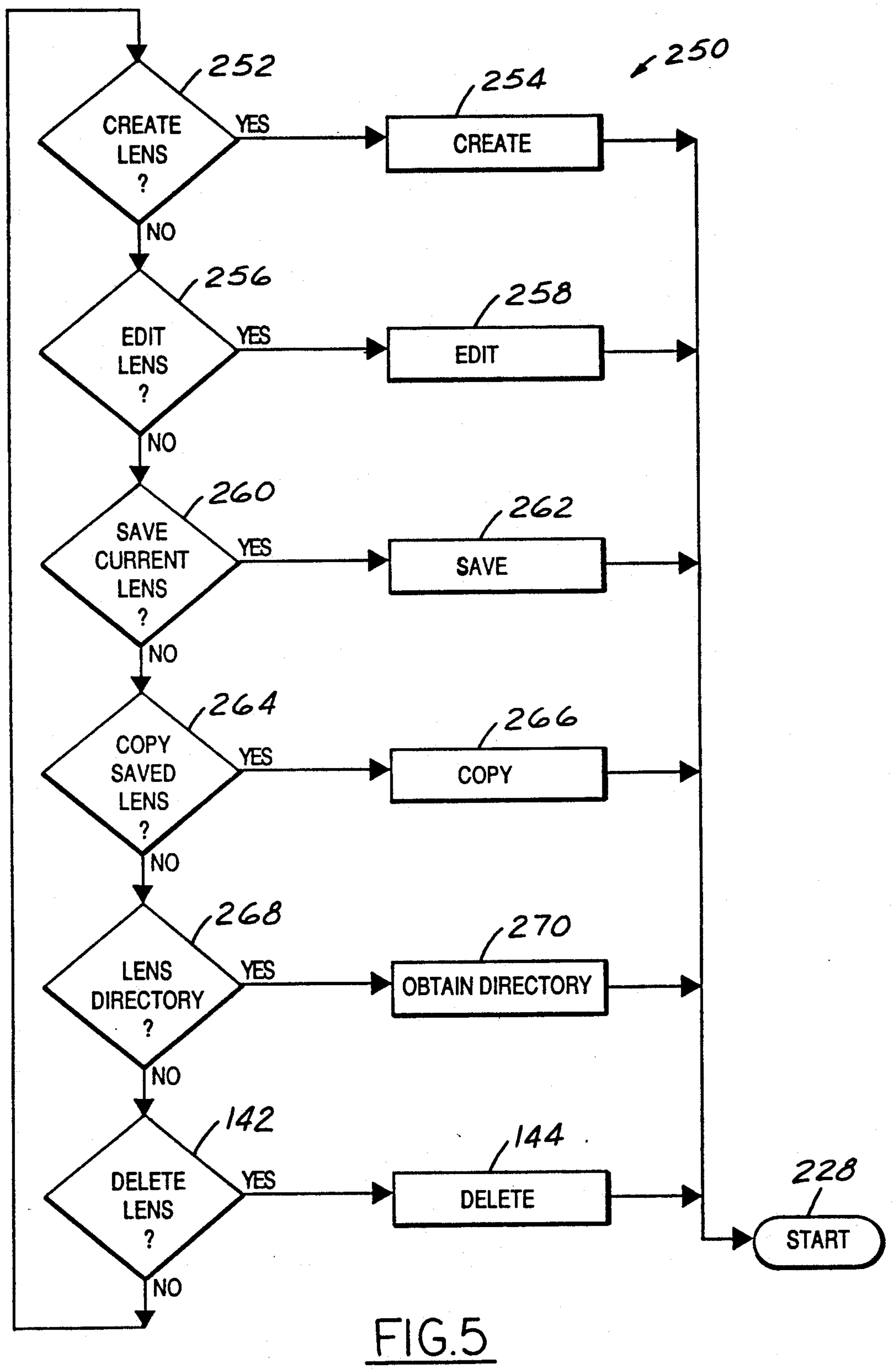
FIG. 5 is a flowchart showing the general sequence of steps associated with the step of "Lens Creation/Edit", of the flowchart shown in FIG. 4.

Referring now to FIG. 5 there is shown flowchart 250 comprising a sequence of steps associated with the lens creation/edit step 230, of flowchart 226, and corresponding to the functions performed by software module 32. Specifically, flowchart 250 includes an initial step 252 which requires a user of system 10 to determine whether a lens is desired to be created. If such lens creation is desired, step 252 is followed by step 254, in which the user creates a lens in accordance with the software resident within central processing unit 12. Alternatively, step 252 is followed by step 256, which requires a user to determine whether a currently stored lens file is desired to be edited. If such an edit is desired, step 256 is followed by step 258 in which a user of system 10 edits an appropriate lens file. As shown, both steps 254 and 258 are followed by step 228. Alternatively, step 256 is followed by step 260 which requires a user of system 10 to determine whether it is desired to save a previously designed lens file. If such storage is desired, step 260 is followed by step 262 in which a current lens file is stored within memory 18. Step 262 is then followed by step 228.

Alternatively, step 260 is followed by step 264, which requires a user of system 10 to determine whether a current lens file is to be copied within another section of memory 18. If such copying is desired, step 264 is followed by step 266 in which the current lens file is copied into another portion of memory 18. Step 266 is then followed by step 228.

Alternatively, step 264 is followed by step 268 in which a user must determine whether a lens directory is desired to be viewed. This lens directory is a listing of all of each and every lens file, currently stored within memory 18. If such a directory is required, step 268 is followed by step 270 in which the central processing unit 12, under the control of module 33 obtains the directory and displays the lens directory upon monitor 20. Step 270 is then followed by step 228.

Figure 6:
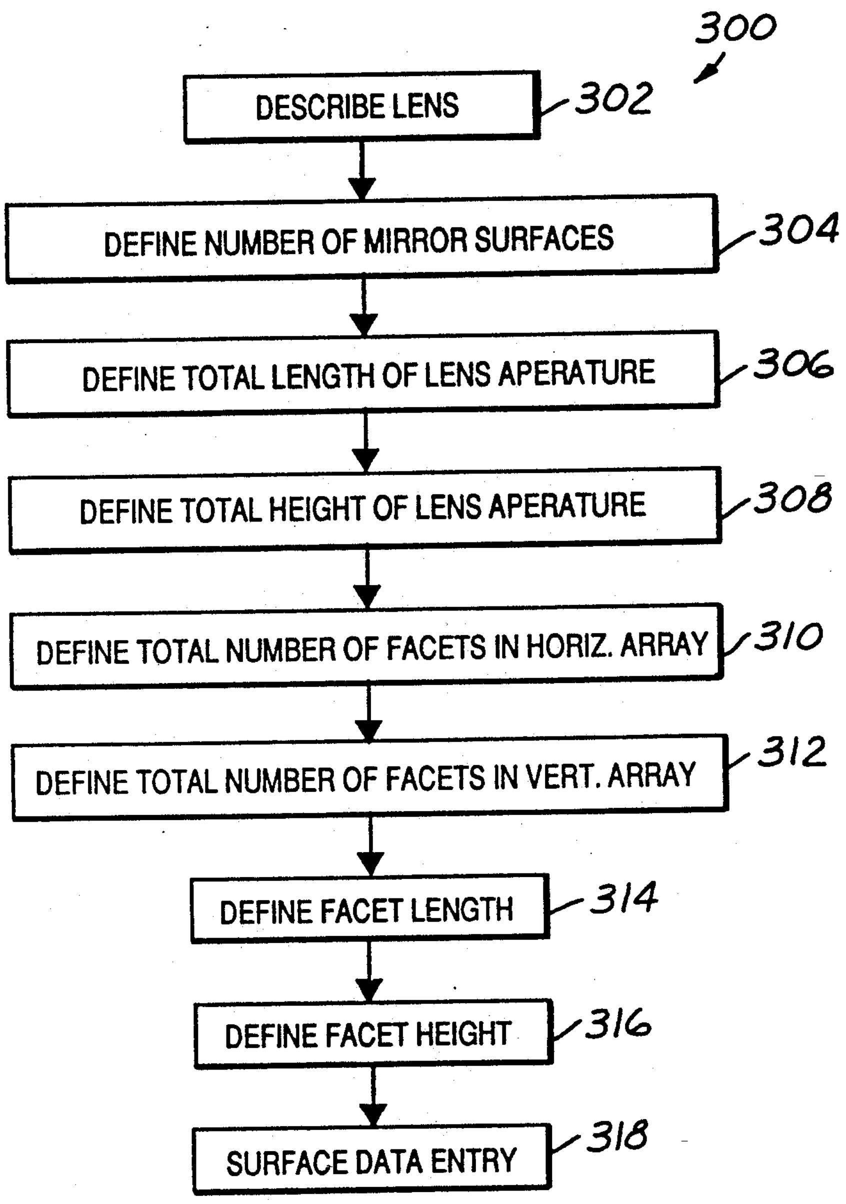
FIG. 6 is a flowchart showing the general sequence of steps associated with the "Create Lens" step, shown in the flowchart of FIG. 5.

Alternatively, step 268 is followed by step 272 in which a user must determine whether a previously designed lens file is to be deleted. If such a deletion is desired, step 272 is followed by step 274 in which the specified lens file is deleted. Step 274 is followed by step 228. Alternatively, step 272 is followed by step 252. In the manner shown within flowchart 250, it should be obvious to one of ordinary skill in the art that system 10 selectively prompts a lighting designer to create or edit a lens file specification and then to use the lens file in the design of a lighting system. To further understand the steps involved in lens design, reference is now made to flowchart 300, of FIG. 6, which comprises a sequence of steps associated with the "create lens" step 252. Specifically, flowchart 300 includes an initial step 302, which requires a user to describe the lens to be created in a manner which will allow the lens file to be quickly recognized as being applicable to a certain type of lens application. This description, textual in nature, is meant to allow another designer, unfamiliar with this lens specific design, to gain efficient knowledge of the type and use of this designed lens.

Step 302 is followed by step 304 which requires a lighting designer to specify the number of mirror surfaces associated with the lens application. That is, while the mirror is normally thought of as a single surface, it is possible, within system 10 to define it as "pieces" of several surfaces, each having its own unique aperture. Step 304 is then followed by step 306 which requires a lighting designer to specify or define the total length of the lens aperture. This length should be the total horizontal extent of the faceted lens, including all facets, but no supporting structural material. The height of the lens aperture is then defined in step 308. Similarly, the lens height, in the preferred embodiment of the invention, is defined to be the total vertical extent of the faceted lens, including all facets but no outside structural material.

Step 310 follows step 308 and, in this step, a lighting designer is prompted to define the total number of facets in the horizontal lens array while, in step 310, the designer is prompted to define the total number of facets in the vertical lens array. It will be realized, by one of ordinary skill in the art, that the definition of aperture length and height, together with the number of horizontal and vertical facets, are cooperatively used by system 10 to define the exact geometric size of each individual facet, since its facet is to be of a substantially similar shape and size.

Step 314 follows step 312 and, in this step, the lighting designer is given an opportunity to modify facet length. Step 316 follows step 314 and, in this step, the lighting designer is given an opportunity to modify the previously specified facet height. Lastly, step 318 follows step 316, and in this step, a lighting designer is prompted to specify the surface data information, associated with the designed mirror.

Figure 8A:
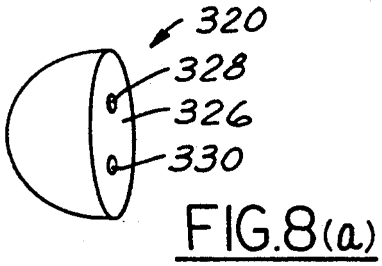
FIGS. 8(A–C) are illustrations of different types of mirror arrangements, employed by the system of the preferred embodiment of this invention and shown in FIG. 1.
Figure 8B:
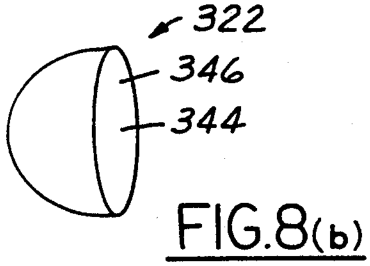
Figure 8C:
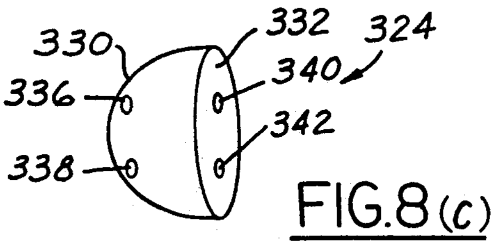

To more fully understand the data required of step 318, it is now necessary to discuss the concepts of mirror surface and aperture. Reference is now made to FIGS. 8(A–C) where there are shown mirrors 320, 322, and 324. As shown, mirror 320 includes a solid surface entry plane 326 having two apertures 328 and 330. If mirror 170 was used in the lens design associated with flowchart 300, step 154 would show one mirrored 326 surface 326 having two apertures 328 and 330. Alternatively, if mirror 324 was utilized within the lens design associated with flowchart 300, there would be two mirrored surfaces 330, and 332, each having two respective apertures 336, 338; and 340, 342. Finally, if mirror 322 was used, within the lens design associated with flowchart 300, there would be a single aperture 344 and a single surface 346.

Figure 7:
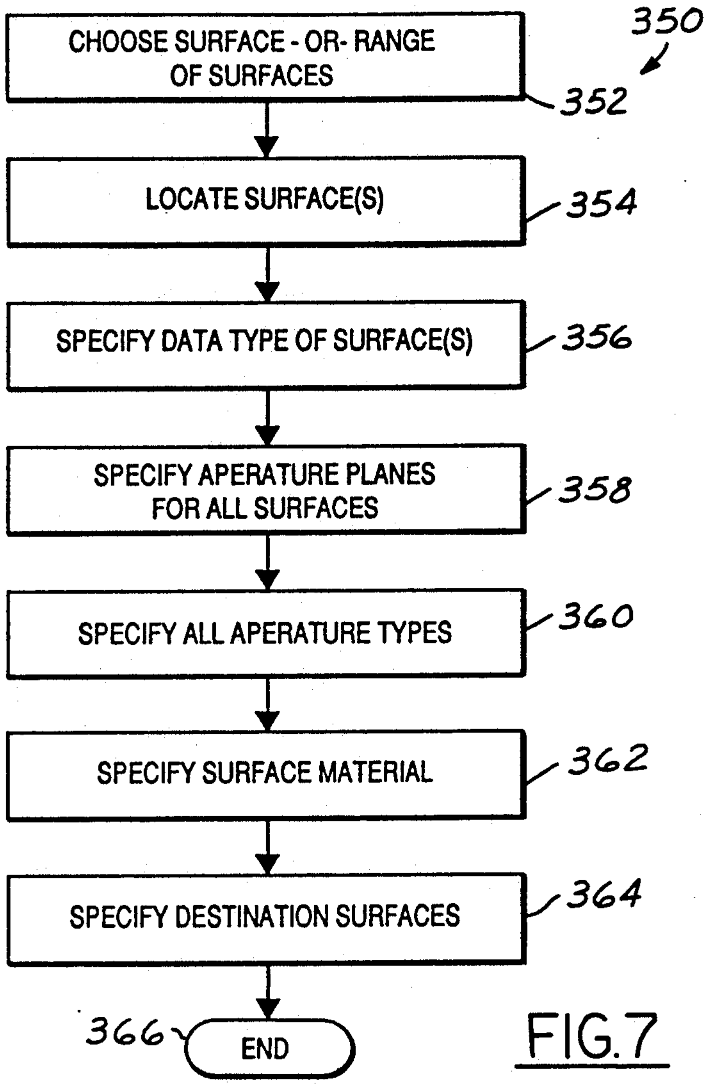
FIG. 7 is a flowchart showing the general sequence of steps associated with the step of "Surface Data Entry", shown in the flowchart of FIG. 6.

Referring now to FIG. 7, there is shown a flowchart 350 illustrating the sequence of steps associated with the "surface data entry" step 318, of flowchart 300. Specifically, flowchart 350 includes an initial step 352 requiring a designer to choose and to number the surfaces or a range of surfaces for which data is now being defined. These surfaces, in the preferred embodiment of this invention, include the facets, mirror(s), dummy surface(s), the plane in front of the lens, and the plane where the rays end. Step 352 is then followed by step 354 in which the lighting design user is required to exactly locate each of the defined surfaces with reference to a given coordinate system, such as the global coordinate system. The associated Euler Angles for each surface are also specified as well in this step.

Step 356 follows step 354 and, in this step, a system user is required to specify the data type of each of the defined surfaces. In the preferred embodiment of the invention, these types may comprise a plane, sphere, conic section, rotationally symmetric polynomial aspheric, toric or cylinder, axicon, or a non-symmetric polynomial aspheric. Once the data types have been selected or defined for each of the surfaces, step 256 is followed by step 358.

In step 358, a user is required to specify the aperture planes for each of the defined surfaces. As shown in reference to FIGS. 8(A–B), a surface may have two aperture planes. If the data for an aperture plane is arranged so that in the equation $A^2+B^2+C^2=D$ we have $D=1$, then the values for "A", "B", and "C" are the direction cosines of the normal to the aperture plane in the local coordinate system, and the value of "D" is the perpendicular distance from the local origin to the plane. Once the aperture planes for all of the surfaces have been defined, step 358 is then followed by step 360 in which a user must define the aperture type and geometric shape for each of the defined apertures in step 358. In a preferred embodiment of this invention, these aperture types are either an inside/open outside blocked or an outside open/inside blocked type. The geometric aperture shapes are defined or constrained to be either circular or rectangular. The radius is to be defined if the aperture is circular. If the aperture is defined to be rectangular, all of the individual perimeter lengths are to be specified.

Step 362 follows step 360 and, in this step, a user of the system 10 must specify the surface material utilized on each side of the defined surfaces, in step 354. Specifically, the options given to the user, in the preferred embodiment of this invention, are air, methyl. methacrylate plastic, polycarbonate plastic, reflector (mirror), opaque, or user defined glass. The following table lists these proposed surface materials along with various refractive indices and reflection losses, utilized by the preferred embodiment of this invention:

| | | | | |
|---|---|---|---|---|
| Air | 1.0 | 1.0 | 1.0 | 0 |
| Methyl-Methacrylate | 1.4913 | 1.48 | 1.50 | 0.01 |
| Polycarbonate | 1.57 | 1.56 | 1.58 | 0.015 |
| Reflector | −1 | −1 | −1 | 0 |
| Opaque | 0 | 0 | 0 | 0 |
| Window Glass | 1.6 | 1.55 | 1.66 | 0.04 |

As shown in the above table, the first three columns show the refractive index for each material in "D", "C", and "F" light respectively. The last column shows the reflection loss for a refraction or the absorption of a reflection. These reflection or refraction indices are then selected by central processing unit 12, depending upon the material selection made in step 362. Step 364 follows step 362 and, in this step, a lighting designer must specify the destination surfaces that a ray of light impacts as it proceeds through the lamp, mirror, and lens assembly. It should be apparent to one of ordinary skill in the art that the steps of each flowchart 200, 226, 250, 300, and 350 may be accomplished, by system 10, in an order which is different from that shown and explained and that this modified sequence is considered to be covered by the preferred embodiment of the invention.

Figure 9:
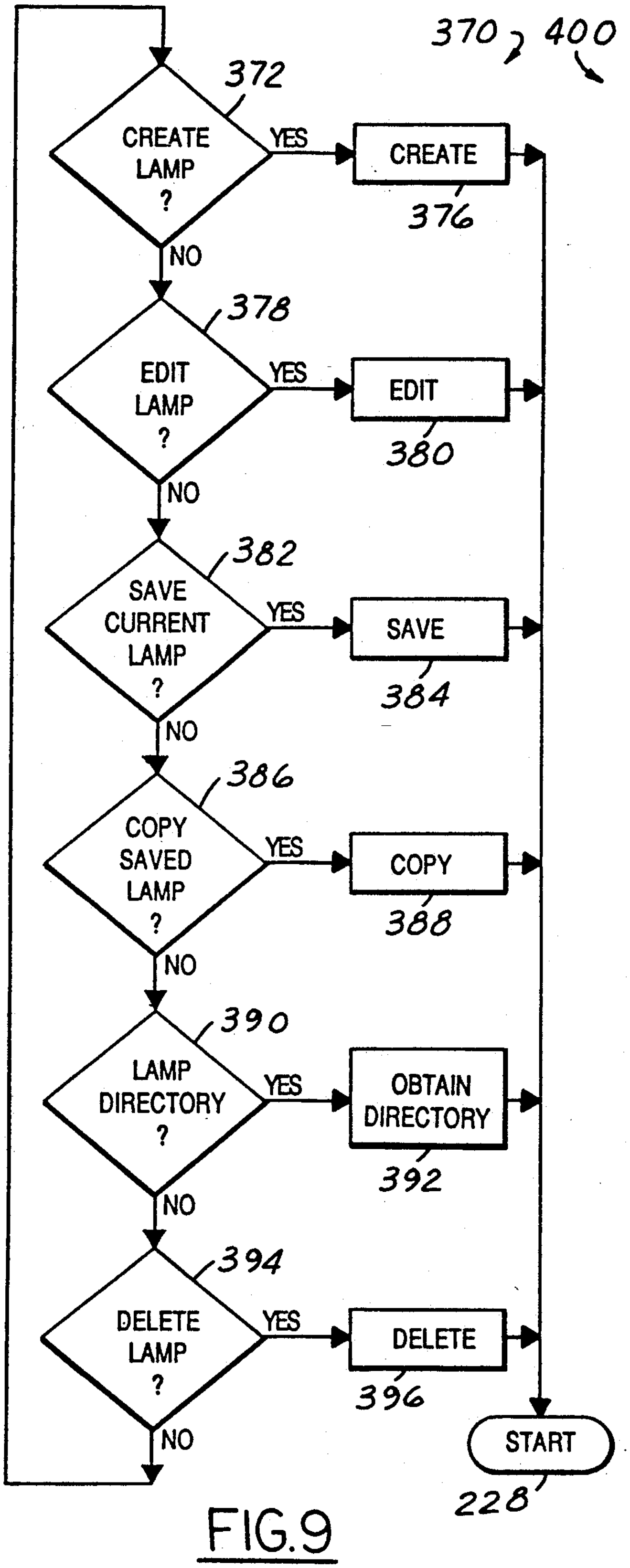
FIG. 9 is a flowchart illustrating the general sequence of steps associated with the step of "Lamp Creation/Edit", shown in the flowchart of FIG. 4.

Referring now to FIG. 9, there is shown flowchart 370, illustrating the general sequence of steps associated with the step of lamp creation/edit 236, of flowchart 226. Specifically, flowchart 370 includes a first step 372 which requires a lighting system designer to determine if a new lamp specification file is desired to be created. If this lamp file is to be created, step 372 is followed by step 376, in which the designer specifies and creates the necessary lamp design file. Step 376 is then followed by step 228.

Alternatively, step 372 is followed by step 378, which requires a lighting system designer to determine if an existing lamp design file must be edited. If editing is required, step 378 is followed by step 380 in which the existing file is edited or modified. Step 380 is then followed by step 228. Alternatively, step 378 is followed by step 382, which requires a lighting system designer to determine if a lamp design file, that has currently been created, is desired to be stored within memory 18. If such storage is required, step 382 is followed by step 384, in which a currently created lamp design file is stored. Step 384 is then followed by step 228.

Alternatively, step 382 is followed by step 386, which requires a lamp designer to determine if a previously stored lamp design file is desired to be stored onto a disk, within assembly 22, or within another portion of memory 18. If such copying is required, step 386 is followed by step 388 in which the copying is effectuated. Step 388 is then followed by step 228.

Alternatively, step 386 is followed by step 390, which requires a lighting system designer to determine whether a lamp directory is required. This lamp directory is stored within memory 18 and includes a listing of all currently stored lamp design files. If such a directory is required, step 390 is then followed by step 392, in which central processing unit 12 is made to obtain a directory from memory 18 and to display the directory upon monitor 20. Step 392 is then followed by step 228.

Alternatively, step 390 is followed by step 394, which requires a lighting system designer to determine if a currently stored lamp design file is to be deleted. If such deletion is required, step 394 is followed by step 396 in which central processing unit 12 is directed to delete a currently stored file, within memory 18. Step 396 is then followed by step 228. Alternatively, step 394 is followed by step 372. It will be apparent to one of ordinary skill in the art, that the sequence of steps associated with flowchart 370, and representing the operation of module 42, allows a lighting system designer to selectively create or specify the performance qualities associated with a desired lamp, to be placed within a typical lighting system.

Figure 10:
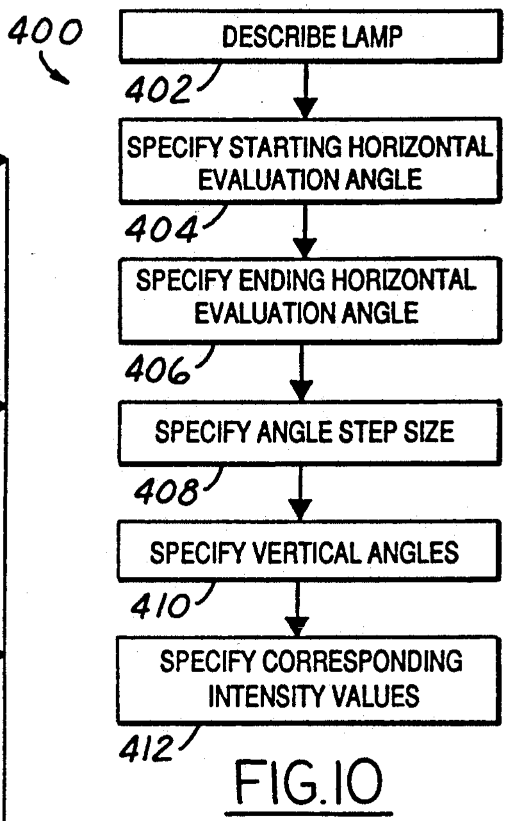
FIG. 10 is a sequence of steps associated with the step of "Create Lamp", shown in the flowchart of FIG. 9.

Referring now to FIG. 10, there is shown flowchart 400, comprising a sequence of steps associated with the step of "create lamp" 372, of flowchart 370. As shown, flowchart 400 includes an initial step 402 in which a lighting system designer is made to describe the lamp that the designer is to create. This description enables one to readily ascertain the type of lamp that is to be designed even when the individual that reads the description has no prior knowledge of the lamp designed and specified within this specific file.

Step 402 is followed by step 404 in which a lighting system designer specifies the starting horizontal evaluation angle associated with the specified lamp. Step 404 is then followed by step 406, which requires a lighting system designer to specify the ending horizontal evaluation angle. Step 408 follows step 406 and requires a lighting system designer to specify the angle step size between the starting horizontal evaluation angle of step 404 and the ending horizontal evaluation angle of step 406. Data, related to the performance of the specified lamp will be given to the user, by system 10, at each stepped horizontal angle between these user defined upper and lower evaluation angle values.

Step 408 is then followed by step 410 which requires a lighting system designer to specify all of the vertical angles to be employed within the lamp design profile. Step 410 is then followed by step 412 which requires a lighting system designer to specify the corresponding desired intensity values for each of the vertical angle/horizontal angle pairs specified in steps 404, 406, 408, and 410. In this manner, a lamp profile is generated and this profile corresponds to specific intensity values, corresponding to a unique vertical and horizontal angle, with reference to the described lamp. In this manner, a lamp generation profile may be created by a lighting system designer, edited, and/or evaluated relative to a target set of intensity and angle values.

Figure 11:
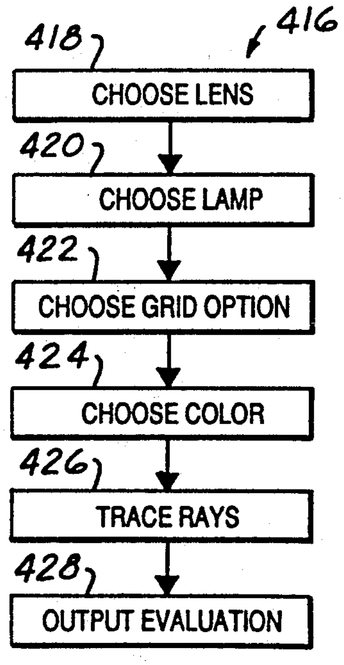
FIG. 11 is a sequence of steps associated with the step of "System Evaluation", shown in the flowchart of FIG. 4.

Referring now to FIG. 11, there is shown flowchart 416, illustrating the sequence of steps associated with the system evaluation step 240, of flowchart 226 and more particularly, with module 46. Specifically, flowchart 416 includes a first step 268 in which a lighting system designer chooses one of the several lens file specifications that were previously developed and stored within memory 18. Step 418 is then followed by step 420 in which the lighting system designer chooses one of several lamp file specifications, previously developed and stored within memory 18.

Step 422 follows step 420. In this step, the lighting system designer is prompted to choose a grid option. In the preferred embodiment of this invention, three standard ray grid options are available, corresponding to 5,000, 7,000, and 12,000 traced rays respectively. It will be apparent to one of ordinary skill in the art, that the more rays that are traced through the system, the better and finer, the overall evaluation becomes.

Step 424 follows step 422. In this step, a lighting system designer chooses a particular color of light that will be used in the overall system evaluation. This color, in the preferred embodiment of this invention, corresponds to "C" light, "D" light, "F" light, or a combination of all three. Once the colors have been chosen, step 424 is then followed by step 426 in which central processor 12, under the control of module 46, traces the number of rays specified in step 422, corresponding to a color specified in step 424, through a lighting system including the lens specified in step 418 and the lamp of step 420. This ray tracing methodology is done in accordance with the knowledge within the prior art and, in fact, has been previously used to evaluate a system by manual computerized methods. One such example of such a methodology includes that included within the paper entitled "Semiautomatic Design of Illuminating Systems", authored by Richard J. Pegis, et al. and appearing in Volume 11 of the May, 1972 issue of *Applied Optics.* Other references which include ray tracing descriptions are "Fundamentals of Optics" by Jenkins and White (McGraw-Hill (1957)) and "A System of Optical Design" by Cox (Focal Press (1967)).

Step 428 follows step 426 in which central processing unit 12 outputs the results of the ray trace evaluation. These results indicate the relative intensity corresponding to the generated light at each of several horizontal and vertical angular points in close proximity to the lighting system. By means of this "iso candle diagram", a lighting system designer will be able to ascertain both the amount and direction of the generated lighting system radiation. In this manner, the lighting system designer will be further able to ascertain the appropriateness of this unique lighting system design for a particular application. A representative listing of a typical specified lamp used by the preferred embodiment of this invention is as follows:

TABLE 1

| VERTICAL ANGLE | 1 | 2 | 3 | 4 | 5 | 6 | 7 | 8 | 9 | 10 | 11 |
|---|---|---|---|---|---|---|---|---|---|---|---|
| | | | | HORIZONTAL ANGLE | | | | | | | |
| 1.25 | 8.30 | 9.00 | 8.30 | 8.30 | 8.30 | 9.00 | 8.30 | 9.00 | 8.30 | 8.30 | 8.30 |
| 2.50 | 8.30 | 9.00 | 9.00 | 9.00 | 9.70 | 9.00 | 9.70 | 8.30 | 9.00 | 8.30 | 7.60 |
| 3.75 | 9.00 | 9.00 | 9.00 | 9.70 | 9.00 | 9.00 | 8.30 | 8.30 | 7.60 | 7.60 | 7.60 |
| 5.00 | 10.40 | 10.40 | 9.70 | 9.70 | 9.70 | 8.30 | 8.30 | 7.60 | 8.30 | 7.60 | 7.60 |
| 6.25 | 11.10 | 11.10 | 10.40 | 9.70 | 9.00 | 8.30 | 7.60 | 6.90 | 6.20 | 6.90 | 6.90 |
| 7.50 | 13.10 | 12.50 | 11.10 | 9.70 | 8.30 | 8.30 | 8.30 | 6.90 | 7.60 | 8.30 | 8.30 |
| 8.75 | 13.80 | 11.10 | 10.40 | 8.30 | 7.60 | 7.60 | 6.90 | 8.30 | 7.60 | 8.30 | 9.00 |
| 10.00 | 12.50 | 10.40 | 9.00 | 8.30 | 6.90 | 7.60 | 7.60 | 9.00 | 8.30 | 9.70 | 9.70 |
| 12.50 | 10.40 | 9.70 | 9.00 | 7.60 | 7.60 | 9.70 | 8.30 | 9.00 | 9.70 | 11.80 | 17.30 |
| 15.00 | 9.70 | 9.00 | 7.60 | 8.30 | 9.70 | 9.70 | 9.70 | 9.70 | 11.80 | 18.00 | 23.50 |
| 17.50 | 9.00 | 6.90 | 7.60 | 9.00 | 9.70 | 9.70 | 9.70 | 11.80 | 18.70 | 24.90 | 27.00 |
| 20.00 | 6.90 | 7.60 | 8.30 | 9.70 | 10.40 | 9.70 | 11.10 | 17.30 | 22.10 | 24.20 | 19.40 |
| 22.50 | 7.60 | 7.60 | 8.30 | 9.70 | 10.40 | 11.10 | 15.20 | 20.10 | 21.40 | 18.00 | 16.60 |
| 25.00 | 7.60 | 8.30 | 9.00 | 9.70 | 11.80 | 13.80 | 18.00 | 18.00 | 16.60 | 17.30 | 15.20 |
| 27.50 | 8.30 | 9.00 | 11.10 | 11.10 | 13.10 | 16.60 | 17.30 | 20.10 | 22.10 | 19.40 | 13.80 |
| 30.00 | 9.00 | 11.10 | 11.10 | 15.20 | 19.40 | 32.50 | 41.50 | 40.10 | 34.60 | 23.50 | 13.80 |
| 35.00 | 11.10 | 16.60 | 28.40 | 53.30 | 80.90 | 87.90 | 71.90 | 54.60 | 40.10 | 24.20 | 10.40 |
| 40.00 | 31.10 | 60.90 | 103.10 | 124.50 | 124.50 | 107.90 | 80.90 | 58.10 | 38.70 | 18.00 | 10.40 |
| 45.00 | 99.60 | 129.40 | 132.80 | 136.30 | 130.00 | 103.80 | 79.60 | 60.20 | 38.70 | 17.30 | 12.50 |
| 50.00 | 132.10 | 136.30 | 139.00 | 133.50 | 116.90 | 96.80 | 82.30 | 69.20 | 43.60 | 18.70 | 16.60 |
| 55.00 | 137.70 | 138.40 | 132.10 | 111.40 | 99.60 | 100.30 | 107.20 | 103.10 | 82.30 | 71.30 | 73.30 |
| 60.00 | 137.00 | 130.70 | 106.50 | 90.60 | 97.50 | 120.40 | 128.70 | 126.60 | 25.20 | 119.00 | 94.80 |

TABLE 1-continued

| | | | | | | | | | | | |
|---|---|---|---|---|---|---|---|---|---|---|---|
| 65.00 | 127.30 | 98.90 | 80.90 | 91.30 | 116.90 | 125.20 | 121.70 | 117.60 | 19.00 | 92.70 | 63.60 |
| 70.00 | 90.60 | 70.60 | 83.70 | 113.40 | 121.10 | 119.70 | 114.80 | 112.10 | 89.90 | 59.50 | 77.50 |
| 75.00 | 66.40 | 82.30 | 114.80 | 121.10 | 119.70 | 109.30 | 96.20 | 82.30 | 45.00 | 72.60 | 110.70 |
| 80.00 | 76.80 | 110.70 | 116.20 | 109.30 | 95.50 | 71.30 | 65.00 | 26.30 | 68.50 | 107.20 | 130.70 |
| 85.00 | 103.80 | 103.80 | 89.90 | 72.60 | 42.20 | 76.80 | 76.80 | 76.80 | 76.80 | 76.80 | 76.80 |
| 90.00 | 76.80 | 76.80 | 76.80 | 76.80 | 76.80 | 76.80 | 76.80 | 76.80 | 76.80 | 76.80 | 76.80 |
| 95.00 | 58.60 | 72.50 | 88.60 | 76.80 | 122.00 | 76.80 | 76.80 | 76.80 | 76.80 | 76.80 | 76.80 |
| 100.00 | 45.30 | 82.30 | 103.20 | 108.10 | 115.70 | 117.10 | 65.00 | 39.70 | 71.80 | 117.10 | 152.00 |
| 105.00 | 79.50 | 52.30 | 108.80 | 126.90 | 126.20 | 124.10 | 96.20 | 98.30 | 39.70 | 73.20 | 118.50 |
| 110.00 | 102.50 | 83.70 | 58.60 | 131.80 | 149.20 | 139.50 | 114.80 | 119.90 | 99.70 | 58.60 | 81.60 |
| 115.00 | 132.50 | 107.40 | 94.10 | 66.20 | 142.90 | 170.80 | 121.70 | 138.80 | 27.60 | 103.90 | 76.00 |
| 120.00 | 160.40 | 135.30 | 113.70 | 105.30 | 64.80 | 131.80 | 128.70 | 142.20 | 40.10 | 139.50 | 106.00 |
| 125.00 | 156.20 | 159.00 | 133.90 | 119.20 | 113.70 | 66.20 | 107.20 | 152.00 | 40.80 | 139.50 | 135.30 |
| 130.00 | 158.30 | 154.10 | 159.00 | 138.10 | 126.20 | 132.50 | 82.30 | 142.20 | 30.10 | 190.40 | 140.80 |
| 135.00 | 138.80 | 151.30 | 152.00 | 155.50 | 138.80 | 156.20 | 79.60 | 51.60 | 00.40 | 103.90 | 184.10 |
| 140.00 | 137.40 | 142.90 | 148.50 | 149.90 | 150.60 | 166.60 | 80.90 | 105.30 | 43.90 | 76.00 | 71.10 |
| 145.00 | 142.20 | 152.70 | 168.70 | 171.50 | 160.40 | 181.30 | 71.90 | 94.80 | 59.30 | 41.10 | 65.50 |
| 150.00 | 38.30 | 121.30 | 119.90 | 146.40 | 179.20 | 173.60 | 41.50 | 83.70 | 28.60 | 25.10 | 34.20 |
| 152.50 | 16.00 | 32.10 | 75.30 | 73.90 | 91.30 | 97.60 | 17.30 | 32.10 | 15.30 | 13.90 | 16.60 |
| 155.00 | 13.20 | 15.30 | 21.60 | 52.30 | 51.60 | 58.60 | 18.00 | 23.70 | 13.20 | 12.60 | 12.60 |
| 157.50 | 11.90 | 12.60 | 11.90 | 13.20 | 31.40 | 31.40 | 15.20 | 20.20 | 13.20 | 12.60 | 11.90 |
| 160.00 | 12.60 | 11.20 | 11.20 | 11.90 | 11.90 | 15.30 | 11.10 | 14.60 | 12.60 | 11.90 | 11.90 |
| 162.50 | 10.50 | 11.20 | 11.20 | 10.50 | 11.20 | 11.20 | 9.70 | 11.20 | 11.20 | 11.20 | 11.90 |
| 165.00 | 10.50 | 10.50 | 10.50 | 9.80 | 9.80 | 10.50 | 9.70 | 10.50 | 12.60 | 10.50 | 10.50 |
| 167.50 | 9.80 | 10.50 | 9.80 | 9.80 | 9.80 | 10.50 | 8.30 | 10.50 | 10.50 | 11.20 | 10.50 |
| 170.00 | 10.50 | 9.80 | 9.80 | 10.50 | 11.20 | 10.50 | 7.60 | 9.80 | 10.50 | 9.80 | 10.50 |
| 171.25 | 9.80 | 9.80 | 9.80 | 9.80 | 9.10 | 9.80 | 6.90 | 9.80 | 9.10 | 9.80 | 10.50 |
| 172.50 | 9.80 | 3.50 | 10.50 | 9.80 | 10.50 | 10.50 | 8.30 | 9.80 | 9.80 | 9.80 | 9.80 |
| 173.75 | 9.80 | 9.80 | 10.50 | 9.80 | 9.80 | 9.10 | 7.60 | 9.10 | 9.80 | 11.90 | 9.10 |
| 175.00 | 9.80 | 9.80 | 11.20 | 9.80 | 9.80 | 10.50 | 8.30 | 9.80 | 6.30 | 9.80 | 9.80 |
| 176.25 | 9.80 | 9.10 | 9.10 | 10.50 | 9.10 | 9.10 | 8.30 | 9.80 | 9.80 | 8.40 | 9.80 |

| VERTICAL ANGLE | 12 | 13 | 14 | 15 | 16 |
|---|---|---|---|---|---|
| | HORIZONTAL ANGLE | | | | |
| 1.25 | 8.30 | 8.30 | 8.30 | 8.30 | 8.30 |
| 2.50 | 8.30 | 6.90 | 8.30 | 8.30 | 7.60 |
| 3.75 | 7.60 | 7.60 | 7.60 | 8.30 | 9.00 |
| 5.00 | 7.60 | 8.30 | 8.30 | 8.30 | 9.70 |
| 6.25 | 7.60 | 8.30 | 9.00 | 10.40 | 10.40 |
| 7.50 | 9.70 | 9.70 | 11.80 | 13.10 | 15.20 |
| 8.75 | 10.40 | 13.10 | 14.50 | 16.60 | 17.30 |
| 10.00 | 14.50 | 20.10 | 20.80 | 22.10 | 19.40 |
| 12.50 | 22.10 | 23.50 | 24.20 | 20.80 | 14.50 |
| 15.00 | 25.60 | 22.80 | 20.80 | 15.20 | 11.10 |
| 17.50 | 21.40 | 20.10 | 15.20 | 10.40 | 10.40 |
| 20.00 | 18.00 | 14.50 | 10.40 | 9.70 | 7.60 |
| 22.50 | 14.50 | 11.10 | 9.00 | 7.60 | 7.60 |
| 25.00 | 11.10 | 9.00 | 7.60 | 6.90 | 6.90 |
| 27.50 | 9.00 | 8.30 | 7.60 | 8.30 | 7.60 |
| 30.00 | 9.00 | 8.30 | 9.00 | 9.00 | 7.60 |
| 35.00 | 9.70 | 9.70 | 9.70 | 9.70 | 9.70 |
| 40.00 | 9.70 | 9.70 | 9.70 | 10.40 | 39.40 |
| 45.00 | 12.50 | 11.80 | 22.10 | 58.80 | 84.40 |
| 50.00 | 27.70 | 42.20 | 77.50 | 99.60 | 119.00 |
| 55.00 | 70.60 | 80.90 | 94.10 | 116.20 | 132.80 |
| 60.00 | 71.30 | 85.10 | 111.40 | 130.70 | 134.20 |
| 65.00 | 77.50 | 107.90 | 128.70 | 130.70 | 133.50 |
| 70.00 | 110.70 | 131.40 | 132.80 | 134.90 | 123.10 |
| 75.00 | 133.50 | 134.20 | 136.30 | 121.70 | 85.10 |
| 80.00 | 132.10 | 134.90 | 120.40 | 82.30 | 38.70 |
| 85.00 | 76.80 | 76.80 | 76.80 | 76.80 | 76.80 |
| 90.00 | 76.80 | 76.80 | 76.80 | 76.80 | 76.80 |
| 95.00 | 76.80 | 76.80 | 76.80 | 76.80 | 76.80 |
| 100.00 | 153.40 | 157.60 | 127.60 | 92.00 | 57.20 |
| 105.00 | 154.10 | 156.90 | 159.70 | 126.20 | 94.10 |
| 110.00 | 122.70 | 155.50 | 159.00 | 161.80 | 129.70 |
| 115.00 | 89.20 | 124.80 | 157.60 | 159.70 | 162.50 |
| 120.00 | 87.20 | 96.20 | 129.00 | 158.30 | 158.30 |
| 125.00 | 103.20 | 99.70 | 103.90 | 129.70 | 156.20 |
| 130.00 | 136.70 | 101.10 | 110.20 | 112.30 | 132.50 |
| 135.00 | 230.80 | 175.70 | 101.10 | 122.00 | 122.00 |
| 140.00 | 67.60 | 79.50 | 122.70 | 89.90 | 129.70 |
| 145.00 | 69.70 | 65.50 | 62.80 | 81.60 | 72.50 |
| 150.00 | 34.20 | 31.40 | 25.10 | 30.70 | 43.90 |
| 152.50 | 17.40 | 16.70 | 13.20 | 15.30 | 15.30 |
| 155.00 | 12.60 | 14.60 | 14.60 | 14.60 | 13.90 |
| 157.50 | 12.60 | 11.90 | 12.60 | 13.20 | 13.20 |
| 160.00 | 11.20 | 11.90 | 10.50 | 11.90 | 11.90 |
| 162.50 | 12.60 | 11.20 | 11.20 | 11.20 | 10.50 |
| 165.00 | 10.50 | 9.80 | 9.80 | 9.80 | 9.80 |
| 167.50 | 10.50 | 9.10 | 10.50 | 10.50 | 10.50 |

TABLE 1-continued

| | | | | | |
|---|---|---|---|---|---|
| 170.00 | 10.50 | 10.50 | 10.50 | 10.50 | 11.20 |
| 171.25 | 10.50 | 11.20 | 9.80 | 10.50 | 9.80 |
| 172.50 | 10.50 | 9.80 | 9.80 | 9.80 | 9.80 |
| 173.75 | 9.80 | 9.80 | 11.20 | 9.80 | 9.80 |
| 175.00 | 9.80 | 9.10 | 9.80 | 9.80 | 10.50 |
| 176.25 | 9.80 | 9.80 | 11.90 | 9.80 | 9.80 |

(where vertical angle 1 = 0°, vertical angle 16 = 359° and where angles 2-15 are equal increments between angles 1 and 16).

Figure 12:
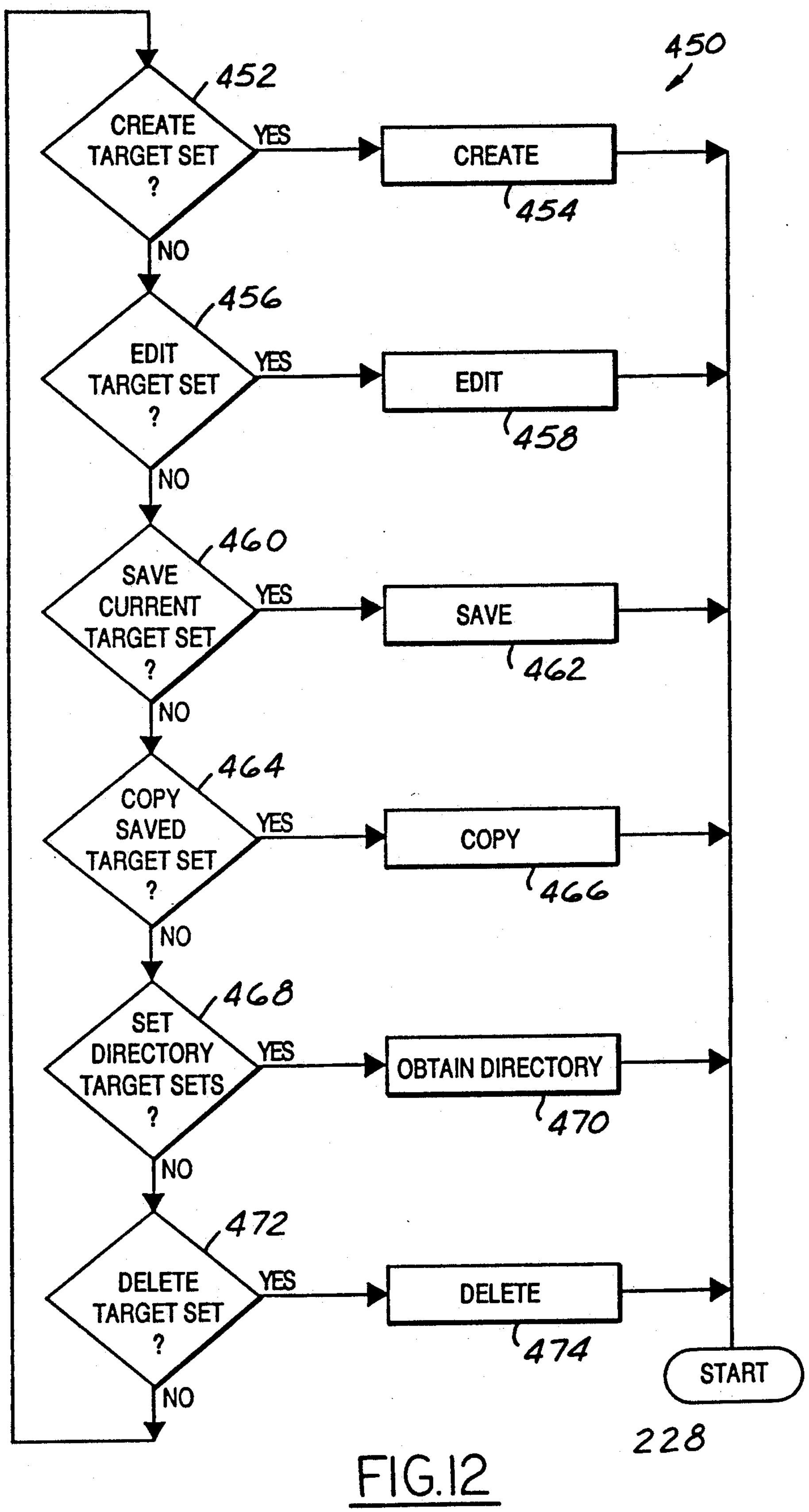
FIG. 12 is a sequence of steps associated with the step of "Performance Target Creation/Edit", shown in the flowchart of FIG. 4.

Referring now to FIG. 12 there is shown flowchart 450, corresponding to the target creation/edit step 242, of flowchart 226, and more particularly to module 56. Specifically, flowchart 450 includes an initial step 452 in which a lighting system designer must ascertain whether a target profile set of data is desired to be created. If such creation is desired, step 452 is followed by step 454, in which the target set is created. Step 454 is then followed by step 228.

Alternatively, step 452 is followed by step 456, which requires a lighting system designer to determine whether a previously created target set of profile data is required to be edited. If such editing is required, step 456 is followed by step 458 in which such editing is accomplished by means of keyboard 24. Step 458 is then followed by step 228.

Alternatively, step 456 is followed by step 460, which requires a lighting system designer to determine whether a currently produced target set of data is needed or desired to be stored within memory 18. If such storage is required, step 460 is followed by step 462. Step 462 is then followed by step 228.

Alternatively, step 460 is followed by step 464, which requires a lighting system designer to determine whether a previously created and stored target set of data is desired to be copied to a disk, residing within assembly 22 or displayed upon monitor 20. If such copying is required, step 464 is followed by step 466 in which central processing unit 12, is directed to copy a previously created and stored target set of data, to either assembly 22 or monitor 20. Step 466 is then followed by step 468.

Alternatively, step 464 is followed by step 468, which requires a lighting system designer to determine if a directory of target sets is required to be analyzed. This directory includes a master file identifying all previously created and stored target profile sets of data. If such a directory is required, step 468 is followed by step 470 in which central processing unit 12 is directed to obtain the data from memory 18 and display the directory upon monitor 20. Step 470 is followed by step 228.

Alternatively, step 468 is followed by step 472 in which a lighting system designer must determine if a previously created and stored target set of data is to be deleted. If such deletion is required, step 472 is followed by step 474 in which central processing unit 12 is directed, by module 34, to delete a previously created and stored target set of data. Step 474 is followed by step 228. Alternatively, step 472 is followed by step 452.

Figure 13:
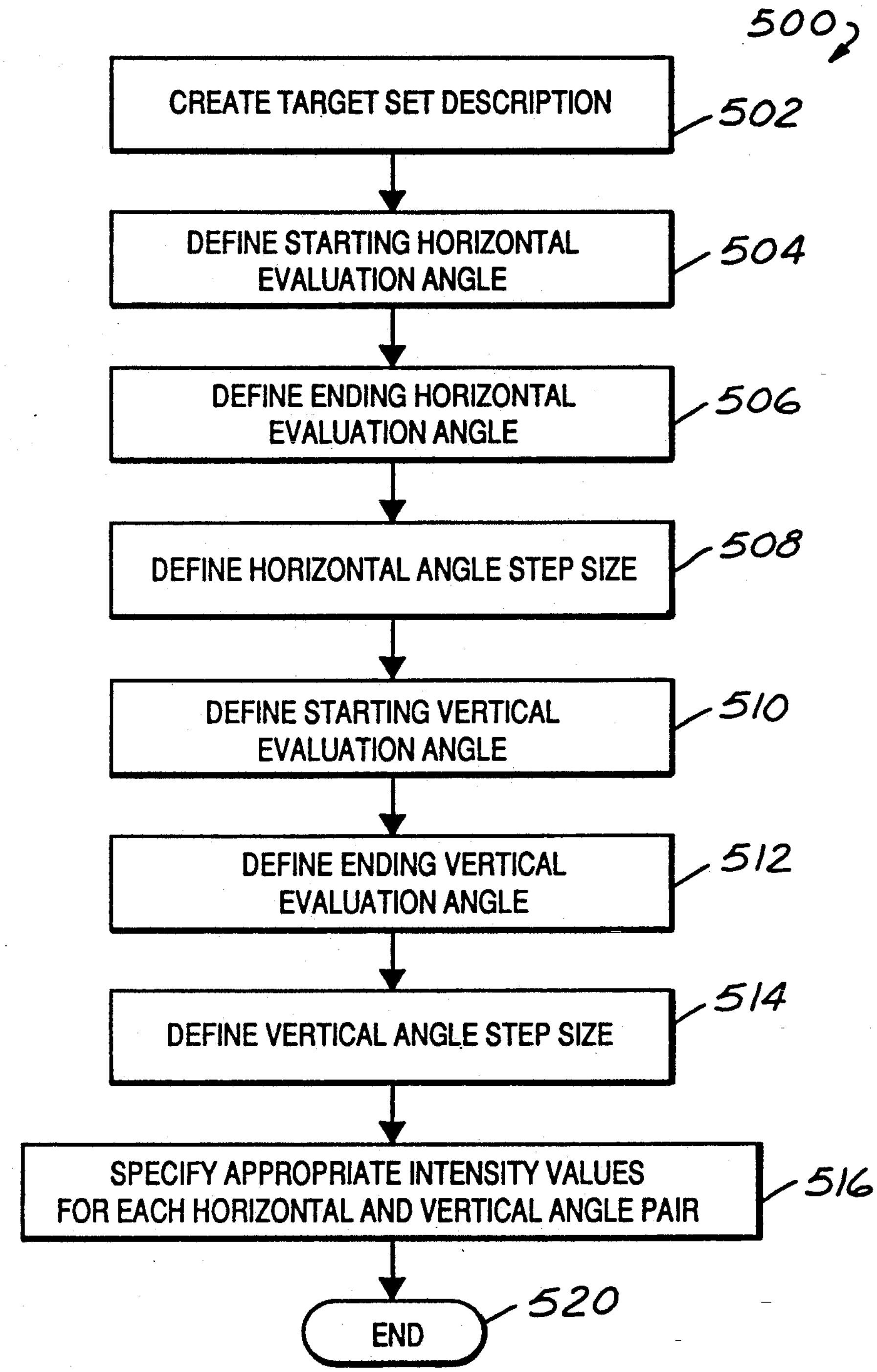
FIG. 13 is a sequence of steps associated with the step of "Create Target Set", shown in the flowchart of FIG. 12.

Referring now to FIG. 13, there is shown flowchart 500 comprising a sequence of steps associated with the creation of a target set of profile data, such as shown in step 452 of flowchart 450.

Specifically, flowchart 500 includes a first step 502 in which a lighting system designer is prompted to create a description of a target set of data by which the target set may be readily obtained from memory 18. Step 502 is then followed by step 504 which requires a lighting system designer to define the starting horizontal evaluation angle. Step 504 is then followed by step 506 which requires a lighting system designer to define the ending horizontal evaluation angle. Step 508 follows step 506 and, in this step, the lighting system designer is prompted to define the horizontal angle step size between the starting and ending angles, respectively defined in steps 504 and 506.

Step 510 follows step 508 and, in this step, a lighting system designer is prompted to define a starting vertical evaluation angle. Step 512 follows step 510 and, in this step, a lighting system designer is prompted to define an ending vertical evaluation angle. Step 514 follows step 512 and, in this step, a lighting system designer is prompted to define an angle step size between the starting vertical evaluation angle, defined in step 510, and the ending vertical evaluation angle, defined in step 512.

Step 516 follows step 514 and, in this step, a lighting system designer is prompted to specify the appropriate intensity values for each horizontal and vertical angular pair corresponding to the angles defined in steps 504, 506, 508, and 512. In this manner, a lighting system or lamp profile is created and corresponds to separate vertical and horizontal coordinate angular values in close proximity to a typical design lamp. Each angular value will have a specific desired target intensity value associated with it. Target values may be defined by the system user or directly taken from such prior art references including the various lighting design manuals of the Society of Automotive Engines.

Figure 14:
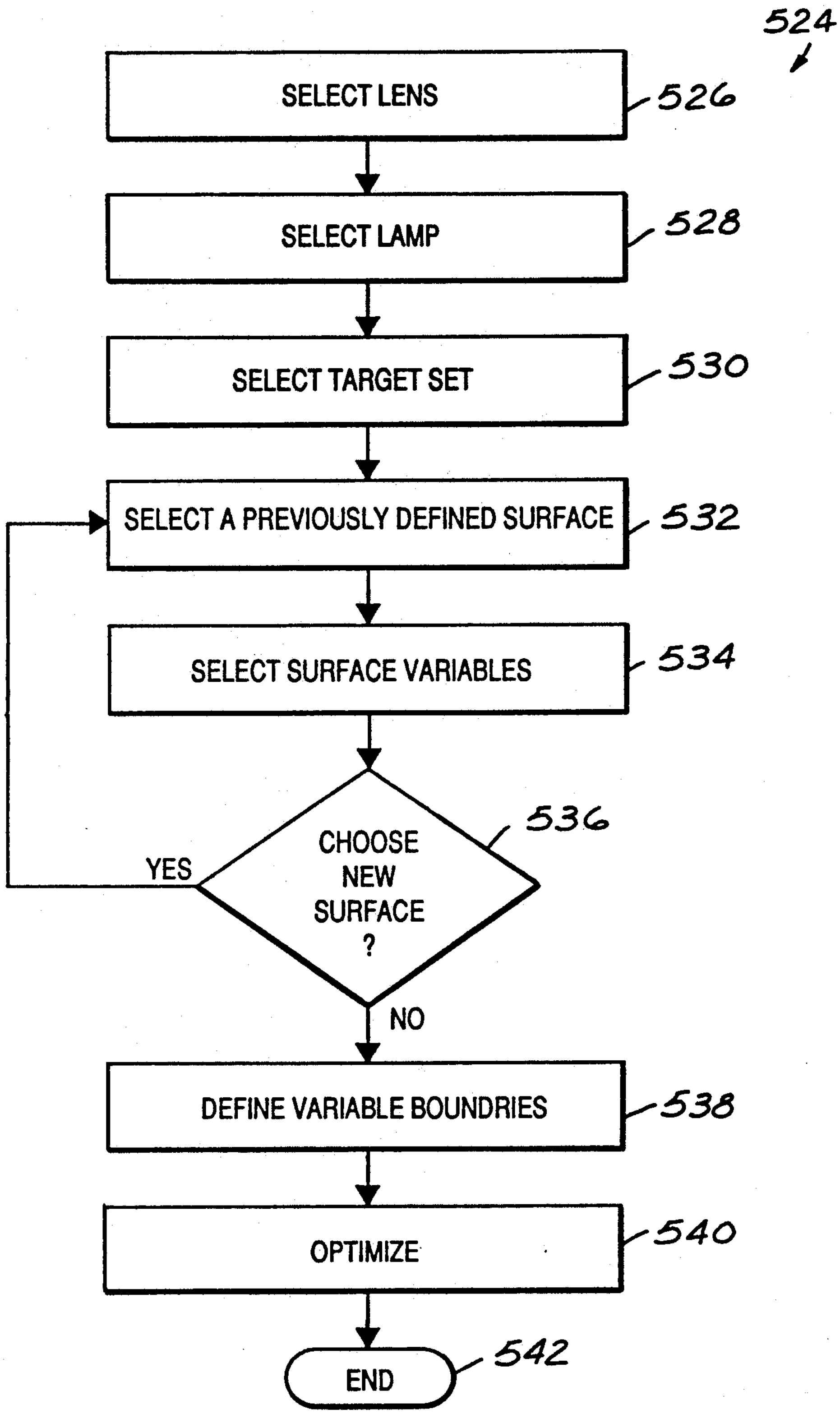
FIG. 14 is a sequence of steps associated with the step of "Optimization", shown in the flowchart of FIG. 4.

In this manner, the actual angular values and corresponding intensities of a previously design lighting system may be compared and evaluated with this target set of angular and intensity valued data, in order to determine if the previously designed system adequately meets the application needs, as defined in the target lighting system. This optimization process is generally described in step 246 of flowchart 226, and is performed by processor 12, under the control of module 48. More particularly, the sequence of steps associated with step 246 is shown in flowchart 524 of FIG. 14.

Specifically, flowchart 524 includes an initial step 526, which requires a lighting system designer to select a previously created lens file. Step 526 is then followed by step 528 which requires a lighting system designer to select a previously created lamp file. Step 530 follows step 528 and, in this step, a previously created target profile data set is selected by the designer.

Step 532 follows step 530 in which a designer is prompted to select a previously defined surface with which optimization may occur. Step 534 follows step 532. In this step, a designer is prompted to define the variables that uniquely correspond to the defined surface, in step 532. Step 536 follows step 534 in which a designer is prompted to ascertain whether a new and different surface is desired to be selected and to be concurrently optimized. If such a new surface is not needed, step 536 is followed by step 538 in which a designer is prompted to define the boundaries associated with each of the variables, of step 534. Alternatively, step 536 is followed by step 532.

Step 538 is followed by step 550 in which an optimization procedure is performed upon the surface chosen in step 532 and more particularly, upon each of the variables defined in step 534. This optimization procedure modifies each of the variables, chosen in step 534, within the boundaries of step 538. At each modification, the optimization procedure automatically traces each of the rays through the lighting system in order to determine if the lighting profile closely matches the previously selected target set, in step 530. If such a match is not found, the optimization procedure continues until the variables are modified such that the target set is closely matched. The optimization procedure associated with step 540 may be selected from any optimization programs currently used in the prior art.

Figure 15:
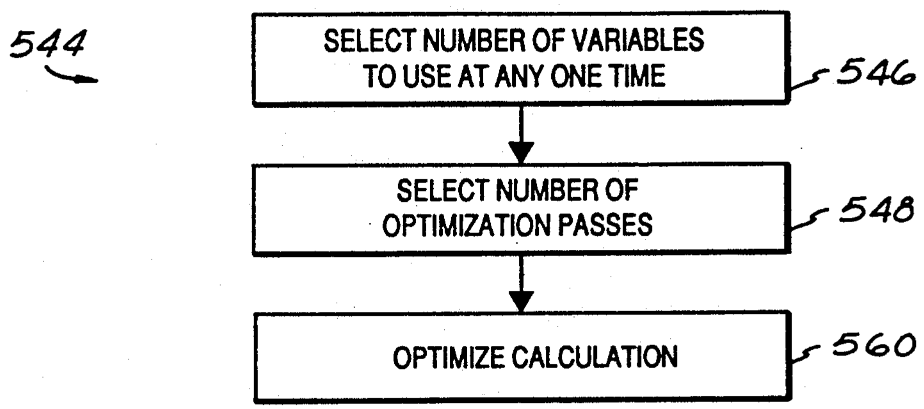
FIG. 15 is a sequence of steps associated with the "Optimize" step, shown in the flowchart of FIG. 14.

More particularly, the general characteristics of appropriate optimization process which may be used by system 10, are shown in flowchart 544, of FIG. 15. Specifically, flowchart 544 includes a first step 546 in which the number of variables to use at any one time is specified. Step 546 is then followed by step 548 in which a lighting system designer selects the number of optimization passes or iterations that the optimization program is to perform. Step 550 follows step 548 and, in this step, the lighting system designer chooses the specific optimization calculation needed by the program. This calculation, as explained earlier, may be performed by any of several prior known optimization procedures. Such procedures are included within the paper entitled "The Generalized Orthonormal Optimization Program and Its Applications", authored by Pegis, et al. and appearing in "Recent Advances in Optimization Techniques" (Wiley, (1966)). Another reference is "Semiautomatic Generation of Optical Prototypes", authored by Pegis, et al. and appearing in *Applied Optics* (Vol. 6, May 1967).

Figure 16:
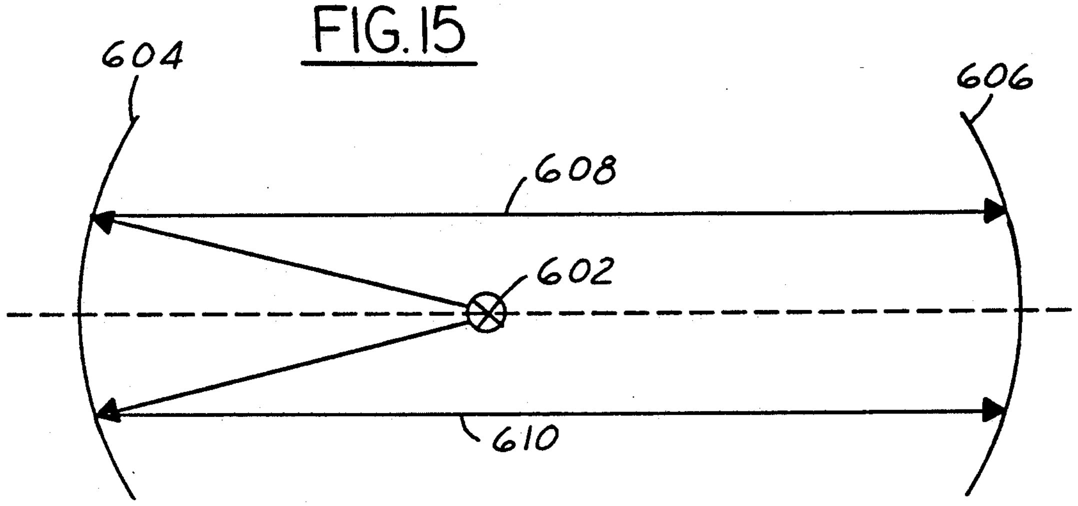
FIG. 16 illustration of two typical light rays traversing through an assembled combination of a lens, lamp, and mirror.

Referring now to FIG. 16, there is shown a typical lighting assembly 600, including lamp 602, mirror 604, and a typical lens 606. As shown, rays emanating from lamp 602 are made to impinge upon mirror 604 before being redirected to lens 606. In this optimization process, variables associated with each of the surfaces 604 and 606 (such as curvature) may be modified such that the rays 608, 610 impinge upon lens 606 in a variety of intensities and directions. In this manner, the radiating light output from assembly 600 is made to have a variable and selective amount of intensity at several different angular distributions surrounding system 600. In this manner, a separate lighting profile may be generated based upon an optimization modification. Further, it will be appreciated by one of ordinary skill in the art that the sequence of steps associated with flowcharts 350, 370, 400, 416, 450, 500, 524, and 544, may be modified as desired and that all such modifications are deemed to be within the scope of this invention.

Figure 17:
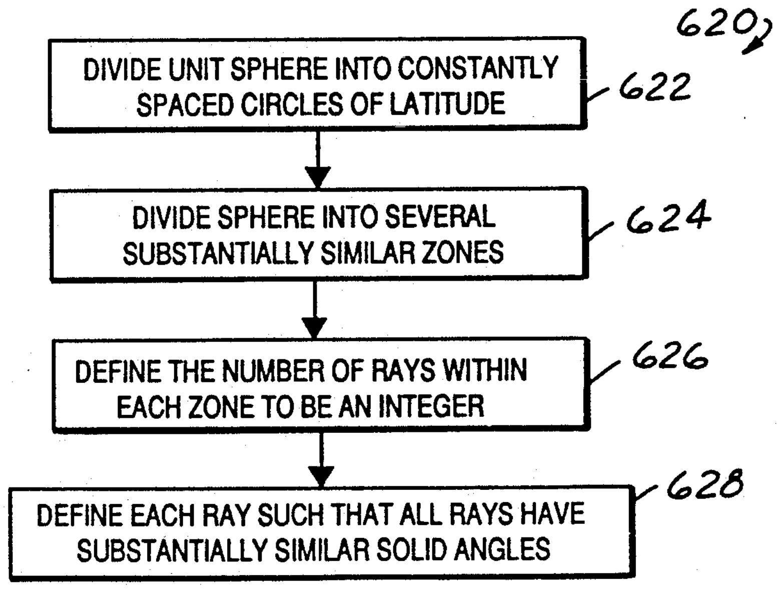
FIG. 17 is a sequence of steps associated with evenly spacing certain light d a typical lamp source.

Referring now to FIG. 17 there is shown flowchart 620 comprising a sequence of steps associated with the distribution of light rays emanating from lamp 602, and traced throughout the system. More particularly, it has been found that an optimal ray tracing is achieved if the rays emanating from lamp 602 are evenly spaced around the surface of the lamp. The steps shown in flowchart 620 are used by central processing unit 12, to generate these rays in an evenly distributed and heuristic manner.

Specifically, flowchart 622 includes an initial step 624 in which central processing unit 12 divides a unit sphere (i.e. a lamp) into constantly spaced circles of latitude. Step 624 follows step 622 in which central processing unit 12 divides the sphere into several substantially similar zones, each having substantially similar spheres of latitude.

Step 636 follows step 624. In this step, central processing unit 12 defines the number of rays within each zone to be an integer, consistent with the number of rays previously selected by the lighting system designer in step 422, of flowchart 416. Step 628 follows step 626 and, in this step, central processing unit 12 defines each traced ray such that all rays have substantially similar solid angles. In this manner, the rays generated from lamp 602 are substantially evenly spaced around the lamp and produce a ray trace which is both optimal, efficient, and accurate.

Figure 18:
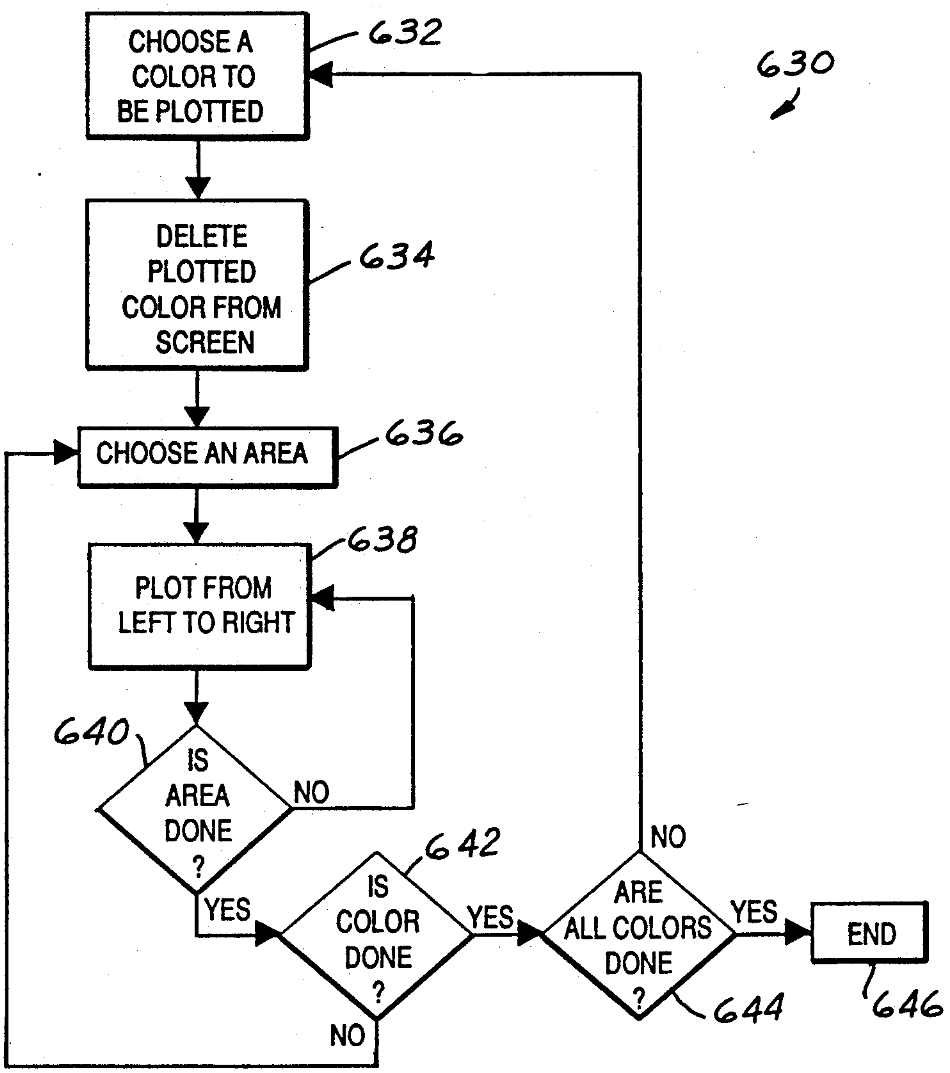
FIG. 18 is a sequence of steps associated with the plotting of certain light design information onto a typical printer, associated with the system of the preferred embodiment of this invention and shown in FIG. 1.

Referring now to FIG. 18, there is shown flowchart 630 comprising a sequence of steps associated with the printing of color information from monitor 20 to printer 16, under the control of the central processing unit 12. It will be apparent to one of ordinary skill in the art, that the steps defined by flowchart 630 and executed by central processing unit 12, provide for an efficient and accurate graph of data appearing on monitor 20, by printer 16.

Specifically, flowchart 630 includes an initial step 632 in which a lighting system designer chooses a color to be plotted and communicates this color to central processing unit 12. Step 632 is followed by step 634, in which central processing unit 12 deletes the selected plotted color from the screen and replaces this color with the color of gray. Step 636 follows step 634 and an area is chosen to be printed.

Figure 19:
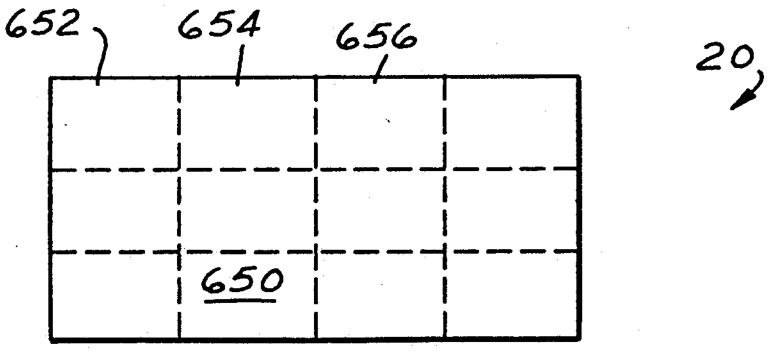
FIG. 19 is an illustration of a display or monitor assembly, utilized by the system shown in FIG. 1, and divided into various pixel areas consistent with the teachings of the preferred embodiment of this invention.

To better understand the concept of areas, reference is now made to FIG. 19, which shows the display surface 650 of monitor 20. As shown, surface 650 may be divided into a number of areas 652, 654, and 656, each corresponding to a separate set of data elements. By dividing surface 650 into a number of separate areas 652, 654, and 656, it has been found that an efficient plotting or graphing of data is achieved. These areas 652, 654, and 656 are used by step 636 to define a printing sequence.

Step 636 is then followed by step 638 in which printer 16 is made to plot or print from a left to right direction. Step 638 is then followed by step 640 in which central processing unit 12 must determine if the current area 652, 654, and 656 is completed. If such area is not completed, step 640 is followed by step 638. Alternatively, step 640 is followed by step 642, which requires central processing unit 12 to determine if that specific color, chosen in step 632 has been completed. If this color is not completed, step 642 is followed by step 636.

Alternatively, step 642 is followed by step 644, which requires central processing unit 12 to determine whether all of the colors to be plotted are completed. If all of the colors are not completed, step 644 is followed by step 632. Alternatively, step 644 is followed by step 646 in which central processing unit 12 determines that all of the plotting or printing has been completed.

It will be apparent to one of ordinary skill in the art, that the plotting of color data, upon monitor 20, may be accomplished efficiently and accurately by dividing the surface 650 into a number of areas 652, 654, 656 and then printing these areas in a direction from left to right while utilizing only a single color at a time. It Will also be appreciated, by one of ordinary skill in the art, that the several steps associated with flowchart 620 and 630 may be modified as desired and that these modifications are deemed to be within the scope of this invention.

It is to be understood that the invention is not limited to the exact construction or method illustrated and described above, but that various changes and modifications may be made without departing from the spirit and scope of the invention, as defined in the following claims.

What is claimed is:

1. A lighting design system comprising:

a central processor under stored program control adapted to allow certain predefined screens of information to be selectively displayed, effective to solicit data from a lighting system designer, thereby, allowing a lens, lamp, and mirror to be specified in a manner which allows the specified lens, lamp, and mirror to cooperatively radiate light having a certain intensity and of a certain pattern;

screen display means, coupled to said central processor for defining the order that said certain predefined screens are to be displayed;

display means, coupled to said central processor, for displaying said certain predefined screens of information in the order defined by said screen display means;

keyboard means, coupled to said central processor, for allowing said lighting system designer to input data to said central processor, in response to said displayed screens of information;

target means for allowing said lighting system designer to specify a desired pattern and intensity of light;

storage means for allowing said specified desired pattern and intensity of light to be stored within said central processor;

performance means for comparing said pattern and intensity of said target means with said pattern and intensity cooperatively generated by said lens, mirror, and lamp and for identifying and displaying differences between said pattern and intensity of said light associated with said target means and said light generated by said lens, mirror, and lamp; and optimization means for selectively modifying said specified lens, mirror, and lamp so as to substantially eliminate differences between said intensity of said light cooperatively generated by said lens, mirror, and lamp and said intensity specified by said target means.

2. The lighting design system of claim 1, wherein said stored program further comprises:

optimization means for selectively modifying said specified lens, mirror, and lamp so as to substantially eliminate differences between said pattern of said light cooperatively generated by said lens, mirror, and lamp and said pattern specified by said target means.

3. The lighting system of claim 1, wherein said stored program comprises:

ray tracing means for tracing the path of several light rays through said specified lens, mirror, and lamp.

4. The lighting design system of claim 1, wherein said stored program comprises:

security means for selectively allowing only certain individuals to specify a lens, mirror, and lamp.

5. The lighting system of claim 1, further comprising:

printing means, coupled to said central processor, for selectively printing data specifying said lens, lamp, and mirror.

6. A method of designing a lighting system having at least one lens, lamp, and mirror, comprising the steps of:

defining a first plurality of data screens, each of said first plurality of data screens being designed to solicit design data associated with said lens;

defining a second plurality of data screens, each of said second plurality of data screens being designed to solicit design data associated with said lamp;

defining a third plurality of data screens, each of said third plurality of data screens being designed to solicit design data associated with said mirror;

defining the order in which said first, second, and third plurality of said data screens are to be displayed;

displaying said first, second, and third plurality of data screens in the previously-defined order;

receiving said solicited data, associated with said first, second, and third plurality of data screens; and specifying a lamp, lens, and mirror by use of said received solicited data;

storing said solicited data;

printing said received solicited data; and determining a pattern end intensity of light cooperatively produced by said specified lens, lamp, and mirror.

7. The method of claim 6 further comprising defining a desired pattern and intensity of light.

8. The method of claim 7 further comprising comparing said desired pattern and intensity of light with said pattern and intensity of light cooperatively generated by said specified lens, lamp, and mirror.

9. The method of claim 8 further comprising modifying said specified lens so that the pattern of said light cooperatively generated by said specified lens, lamp and mirror is substantially similar to said desired pattern.

10. The method of claim 8 further comprising modifying said lamp so that the pattern of said light cooperatively generated by said lens, lamp and mirror is substantially similar to said desired pattern.

11. The method of claim 8 further comprising modifying said specified mirror so that the pattern of said light cooperatively generated by said lens, lamp and mirror is substantially similar to said desired pattern.

12. The method of claim 8 further comprising modifying said specified lens so that the intensity of said light cooperatively generated by said lamp, lens, and mirror is substantially similar to said desired intensity.

13. The method of claim 8 further comprising modifying said specified lamp so that the intensity of said light cooperatively generated by said lamp, lens, and mirror is substantially similar to said desired intensity.

14. The method of claim 8 further comprising modifying said specified mirror so that the intensity of said light cooperatively generated by said lamp, lens, and mirror is substantially similar to said desired intensity.

* * * * *

UNITED STATES PATENT AND TRADEMARK OFFICE

CERTIFICATE OF CORRECTION

PATENT NO. : 5,255,206

DATED : October 19, 1993

INVENTOR(S) : Pegis, Richard

It is certified that error appears in the above-indentified patent and that said Letters Patent is hereby corrected as shown below:

In claim 6, at line 31 of column 24, "end" should be replaced with --and--.

Signed and Sealed this

Twenty-seventh Day of September, 1994

*Attest:*

BRUCE LEHMAN

*Attesting Officer*

*Commissioner of Patents and Trademarks*